(12) United States Patent
Kim

(10) Patent No.: US 12,123,371 B2
(45) Date of Patent: Oct. 22, 2024

(54) THRUST ENHANCING DEVICE

(71) Applicants: Jung Gyu Kim, Seoul (KR); Sung Woo Kim, Osan-si (KR)

(72) Inventor: Sung Woo Kim, Osan-si (KR)

(73) Assignee: Jung Gyu Kim, Seoul (KR)

( * ) Notice: Subject to any disclaimer, the term of this patent is extended or adjusted under 35 U.S.C. 154(b) by 0 days.

(21) Appl. No.: 18/275,097

(22) PCT Filed: Jan. 28, 2022

(86) PCT No.: PCT/KR2022/001610
§ 371 (c)(1),
(2) Date: Jul. 31, 2023

(87) PCT Pub. No.: WO2022/169234
PCT Pub. Date: Aug. 11, 2022

(65) Prior Publication Data
US 2024/0084763 A1    Mar. 14, 2024

(30) Foreign Application Priority Data

Feb. 2, 2021 (KR) .................. 10-2021-0014779
Apr. 29, 2021 (KR) .................. 10-2021-0055976

(51) Int. Cl.
*F02K 1/40*       (2006.01)
*F02K 1/36*       (2006.01)
*F02K 1/46*       (2006.01)

(52) U.S. Cl.
CPC .................. *F02K 1/40* (2013.01); *F02K 1/36* (2013.01); *F02K 1/46* (2013.01); *F05D 2210/34* (2013.01)

(58) Field of Classification Search
CPC ..... F02K 1/28; F02K 1/34; F02K 1/36; F02K 1/386; F02K 1/46; F02C 3/32; B64D 33/04; B64D 33/06; B64D 2033/045
(Continued)

(56) References Cited

U.S. PATENT DOCUMENTS 1,362,997 A * 12/1920 Koleroff ................... F02K 7/12
                                                                                            239/265.17
1,375,601 A *  4/1921 Morize .................... F02K 7/12
                                                                                                60/264
(Continued)

FOREIGN PATENT DOCUMENTS

JP      2016107826 A  *  6/2016  ............ B63H 11/08
KR    10-2008-0056147 A    6/2008

OTHER PUBLICATIONS

Parthiy N. Shah et al., "Engine Air-Brakes. Aerospace & Defense Technology", Online, Apr. 1, 2018, pp. 2-4, figures 1-3.
(Continued)

*Primary Examiner* — Alain Chau
(74) *Attorney, Agent, or Firm* — Sughrue Mion, PLLC

(57) ABSTRACT

A thrust enhancing device is disclosed. The thrust enhancing device enhances thrust of a thrust generation part in a state coupled to the thrust generation part configured to obtain a propulsive force by using a reaction force of a fluid. The thrust enhancing device includes a venturi part configured to receive a basic fluid allowed to flow by the thrust generation part and allow the basic fluid to pass through the inside thereof, and an ejection induction part disposed in an inner flow field of the venturi part and configured to linearize a flow of a fluid to be ejected to the outside of the venturi part.

11 Claims, 34 Drawing Sheets

(58) Field of Classification Search
USPC .................................................. 239/265.17
See application file for complete search history.

(56) References Cited

U.S. PATENT DOCUMENTS

| | | | | | |
|---|---|---|---|---|---|
| 1,493,157 | A | * | 5/1924 | Melot | ........................ F02K 7/12 239/265.17 |
| 2,390,161 | A | * | 12/1945 | Mercier | .................... F02K 5/02 417/174 |
| 2,648,192 | A | * | 8/1953 | Lee | ........................... F02K 1/36 60/233 |
| 3,095,694 | A | * | 7/1963 | Walter | ........................ F02K 1/36 60/761 |
| 3,187,501 | A | * | 6/1965 | Quick | ........................ F02K 1/78 60/264 |
| 3,611,726 | A | * | 10/1971 | Medawar | .................. F02K 1/40 60/264 |
| 3,630,311 | A | * | 12/1971 | Nagamatsu | ............... F02K 1/40 239/265.17 |
| 3,710,890 | A | * | 1/1973 | True | .......................... F02K 1/36 181/220 |
| 3,726,091 | A | * | 4/1973 | Tontini | ..................... F02K 1/36 239/265.17 |
| 5,341,640 | A | * | 8/1994 | Faulkner | .................. F02K 3/10 60/761 |
| 6,360,528 | B1 | * | 3/2002 | Brausch | .................... F02K 1/46 239/265.17 |
| 7,543,452 | B2 | * | 6/2009 | Reba | ......................... F02K 1/40 60/770 |
| 8,015,819 | B2 | * | 9/2011 | Thomas | .................... F02K 1/34 60/770 |
| 9,758,254 | B2 | * | 9/2017 | Moore | .................. B64D 33/06 |
| 2002/0094730 | A1 | | 7/2002 | Schultz et al. | |
| 2005/0215133 | A1 | | 9/2005 | Abdek-Maksound et al. | |
| 2007/0119985 | A1 | * | 5/2007 | Ranganathan | ........ F01N 13/082 239/398 |
| 2008/0078159 | A1 | * | 4/2008 | Thomas | .................... F02K 1/46 60/770 |
| 2009/0072047 | A1 | * | 3/2009 | Greene | ................... F02C 7/141 239/127.3 |
| 2013/0087632 | A1 | * | 4/2013 | Germain | .................. F02K 1/36 239/265.23 |
| 2016/0130011 | A1 | * | 5/2016 | Moore | .................. B64D 33/06 239/265.17 |

OTHER PUBLICATIONS

International Search Report for PCT/KR2022/001610 dated May 19, 2022.

* cited by examiner

THRUST ENHANCING DEVICE

TECHNICAL FIELD

The present invention relates to a thrust enhancing device that is mounted on a thrust generation part of various types of propulsion systems to enhance a propulsive force of the propulsion system, and more particularly, to a thrust enhancing device that increases an overall propulsive force of a propulsion system by increasing a flow rate of a fluid in a flow field by using the Venturi effect.

BACKGROUND ART

There are known various propulsion devices, such as screws of ships or submarines, jet engines or propeller propulsion systems of aircrafts, missiles, or rocket engines, that use reaction forces of fluids.

In the jet engine mounted in the aircraft, intake air and fuel are mixed and exploded in a high-pressure state, and explosion energy is ejected rearward, thereby obtaining a reaction force. This reaction force allows the aircraft to overcome air resistance and move forward at high speed. In case of the rocket engine, a reaction force is outputted by mixing and exploding inside fuel and oxygen without using outside air. Explosive energy ejected from the rocket is applied as a propulsive force to the rocket, thereby allowing the rocket to fly at high speed. In addition, the propeller propulsion system works on the principle that a rotational motion of a rotor blade is converted into thrust. That is, when the rotor blade rotates, a velocity of a fluid at an upper side of the blade is high, and a velocity of the fluid at a lower side of the blade is relatively low, such that a pressure difference is generated, and the blade outputs a lift force.

Meanwhile, jet boats, jet skis, various types of devices for hydro water sports, which use water jets, are based on the principle of traveling on a surface of water or rising in the air by ejecting water at high pressure and using a reaction force generated by the ejection of the water.

The jet boat or the jet ski obtains a propulsive force by ejecting water rearward by rotating an impeller at high speed. In addition, for example, among the devices for hydro water sports, a skyboard (42 in FIG. 21A) or a jetpack (43 in FIG. 22), obtains a propulsive force by obtaining a reaction force by ejecting, through an ejection nozzle, high-pressure water supplied through a hose.

To increase thrust in the propulsion system that obtains the propulsive force by using the reaction force, the propulsion system ejects the fluid at a higher velocity or increases an ejection flow rate. When a total flow rate of the ejected fluid is increased in a state in which an ejection velocity of the fluid is maintained, the reaction force increases, and high thrust may be obtained to that extent.

However, because the thrust generation part of the propulsion system in the related art does not adopt a device capable of increasing the flow rate to increase the reaction force, there is a limitation in enhancing the thrust.

As a technology that constitutes the background of the invention related to the above-mentioned configuration, there is Korean Patent Application Laid-Open No. 1999-000795 (entitled Thrust Enhancing Device for Aircraft).

The disclosed thrust enhancing device is applied to an aircraft mounted with a jet engine that generates thrust by increasing momentum by means of a change in velocity of air between an inlet port and an exhaust port, and the thrust enhancing device includes: an engine having at least one compression means, at least one combustion means, and a duct fan coaxially connected to a turbine; at least one row of ducts provided in a longitudinal direction on a fuselage of the aircraft; an intake nozzle pierced in a direction opposite to a movement direction of the aircraft so that air in the duct may be sucked out into the atmosphere when the aircraft moves; and a damping means configured to convert an air flow so that the air flowing to a rear side of the duct fan of the engine flows toward the duct.

DISCLOSURE

Technical Problem

The present invention has been made in an effort to solve the above-mentioned problems, and an object of the present invention is to provide a thrust enhancing device that increases a flow rate of a finally ejected fluid by using the Venturi effect, thereby increasing a reaction force to a degree corresponding to a flow rate of an added fluid and generating a high-efficiency propulsive force.

Technical Solution

As a technical solution for achieving the above-mentioned object, a thrust enhancing device of the present invention enhances thrust of a thrust generation part in a state of being coupled to the thrust generation part configured to obtain a propulsive force by using a reaction force of a fluid and includes: a venturi part configured to receive a basic fluid allowed to flow by the thrust generation part and allow the basic fluid to pass through the inside thereof, the venturi part being configured to induce a pressure drop in the inside thereof while the basic fluid passes therethrough, suck a surrounding fluid around the thrust generation part into the inside thereof, and then eject the surrounding fluid together with the basic fluid to increase a total ejection flow rate; and an ejection induction part disposed in an inner flow field of the venturi part and configured to linearize a flow of a fluid to be ejected to the outside of the venturi part.

In addition, the venturi part may include: a first venturi coupled to the thrust generation part and including an inlet portion, an outlet portion, and a streamlined neck portion positioned between the inlet portion and the outlet portion and having a smaller inner diameter than the inlet and outlet portions; and a second venturi including an inlet portion, an outlet portion, and a streamlined neck portion positioned between the inlet portion and the outlet portion and having a smaller inner diameter than the inlet and outlet portions, the second venturi being configured to accommodate the first venturi so that the outlet portion of the first venturi is positioned in the neck portion of the second venturi.

In addition, the venturi part may further include a third venturi including an inlet portion, an outlet portion, and a streamlined neck portion formed between the inlet portion and the outlet portion and having a smaller inner diameter than the inlet and outlet portions, the third venturi being configured to accommodate the second venturi so that the outlet portion of the second venturi is positioned in the neck portion of the third venturi.

Further, stream guiders may be provided on inner wall surfaces of the first, second, and third venturis and guide a flow of the fluid.

In addition, the ejection induction part may include a direct-ejection inducer fixed in the outlet portion of the third venturi and having a plurality of straight ejection passageways through which the ejected fluid passes.

Further, two or more outlet portions of the third venturi may be formed in parallel, and the direct-ejection inducers may be respectively mounted in the outlet portions.

In addition, the ejection induction part may include a plurality of bent blades made by cutting ends of the first, second, and third venturis at sides of the outlet portions at predetermined intervals in a circumferential direction and then bending the ends of the first, second, and third venturis toward an inside of a flow field.

In addition, the thrust generation part may include a water jet nozzle, a jet engine, a rocket engine, or a propeller propulsion system that allows water supplied from the outside to pass therethrough and ejects the water.

Further, the thrust generation part may be a turbo-fan jet engine, and a water injector nozzle may be further installed in the venturi part and eject water to be vaporized and expanded by heat generated in the turbo-fan jet engine.

In addition, as a technical solution for achieving the above-mentioned object, a thrust enhancing device of the present invention has a combination of a plurality of venturis having different sizes and an identical central axis and includes: a venturi part configured to induce a pressure drop in the inside thereof while allowing a basic fluid to pass therethrough through a central axis portion, suck a surrounding fluid into the inside thereof, and then eject the surrounding fluid together with the basic fluid to increase a total ejection flow rate.

Advantageous Effects

The thrust enhancing device of the present invention, which is configured described above, increases a flow rate of a finally ejected fluid by using the Venturi effect, thereby increasing the reaction force to a degree corresponding to a flow rate of an added fluid and generating a high-efficiency propulsive force.

In addition, because the high-efficiency propulsive force is generated, it is possible to increase a velocity, traveling time, and a payload when energy consumption remains the same.

Furthermore, it is possible to maintain flight stability, downsize the basic engine or the motor, and remarkably reduce emission of carbon dioxide.

DESCRIPTION OF DRAWINGS

FIGS. 27A and 24B are views illustrating a missile, a rocket engine, and a jet engine to which the thrust enhancing device according to the embodiment of the present invention is applied.

BEST MODE

Hereinafter, one embodiment according to the present invention will be described in more detail with reference to the accompanying drawings.

A thrust enhancing device of the present invention is mounted on various types of propulsion systems that obtain a propulsive force by using a reaction force of an ejected fluid, and the thrust enhancing device enhances thrust of the propulsion system. The way to enhance thrust is to increase a total ejection flow rate.

The increase in total ejection flow rate increases mass of an ejected fluid, such that the thrust naturally increases.

The total ejection flow rate is a flow rate made by summing up a basic flow rate of a fluid ejected from the propulsion system and an additional flow rate of a surrounding fluid sucked into the thrust enhancing device. A method of sucking the surrounding fluid into the thrust enhancing device uses the Venturi principle and will be described below.

In addition, the 'various types of propulsion systems' include all propulsion systems that use a reaction force of an ejected fluid. For example, the propulsion systems may include an internal combustion jet engine, a rocket engine, an electric motor propeller propulsion system, and a water jet nozzle.

The water jet nozzle uses a reaction force in response to an ejection force of water made by ejecting water supplied from the outside. The water jet nozzles are widely used in a field of hydro water sports devices to be described below with reference to FIGS. 20 to 23. In addition, the present propeller propulsion systems include all propulsion systems that push out a fluid (air or water) by using a rotary blade and obtain a propulsive force in response to a reaction of the pushed fluid. The propulsion systems also include an internal combustion engine and a battery motor.

This thrust enhancing device may be made of carbon fiber which is lightweight and has excellent mechanical performance. As known, carbon fiber has ⅕ of a weight of iron but is about 10 times stronger than iron.

A basic structure of the thrust enhancing device of the present invention is to enhance thrust of a thrust generation part in a state of being coupled to the thrust generation part configured to obtain a propulsive force by using a reaction force of a fluid, and the thrust enhancing device includes a venturi part configured to receive a basic fluid allowed to flow by the thrust generation part and allow the basic fluid to pass through the inside thereof, the venturi part being configured to induce a pressure drop in the inside thereof while the basic fluid passes therethrough, suck a surrounding fluid around the thrust generation part into the inside thereof, and then eject the surrounding fluid together with the basic fluid to increase a total flow rate of an ejected fluid, and an ejection induction part disposed in an inner flow field of the venturi part and configured to linearize the flow of a fluid to be ejected to the outside of the venturi part.

Figure 1:
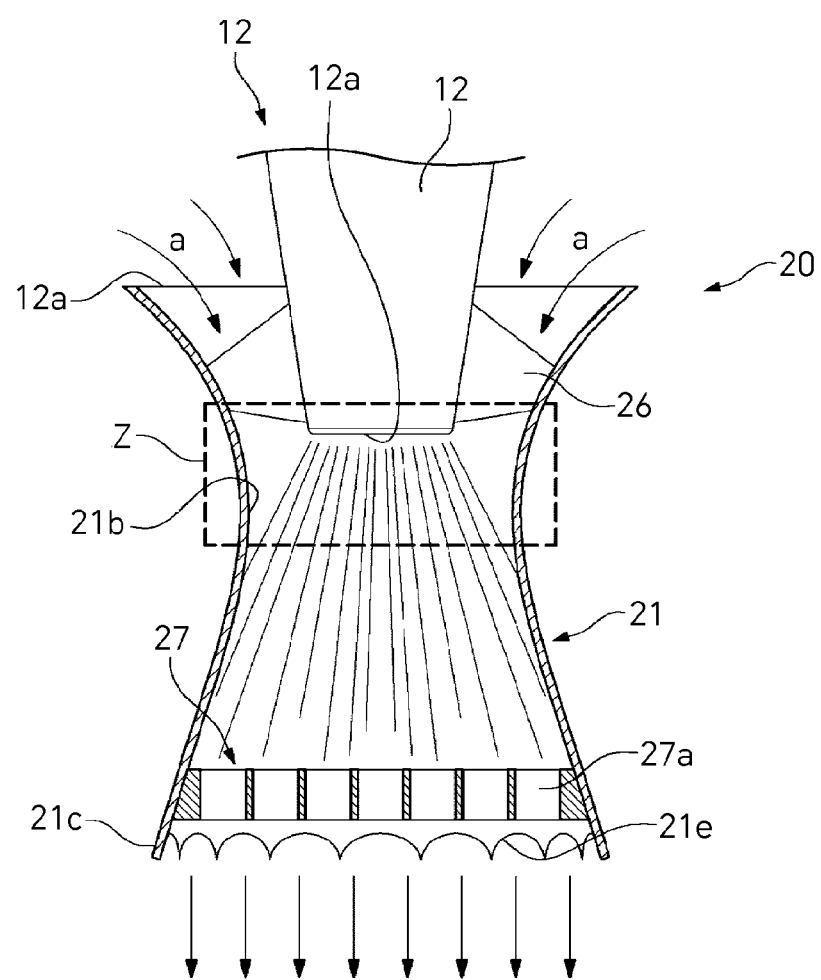
FIGS. 1 and 2 are views for explaining a configuration and an operational principle of a thrust enhancing device according to an embodiment of the present invention.
Figure 2:
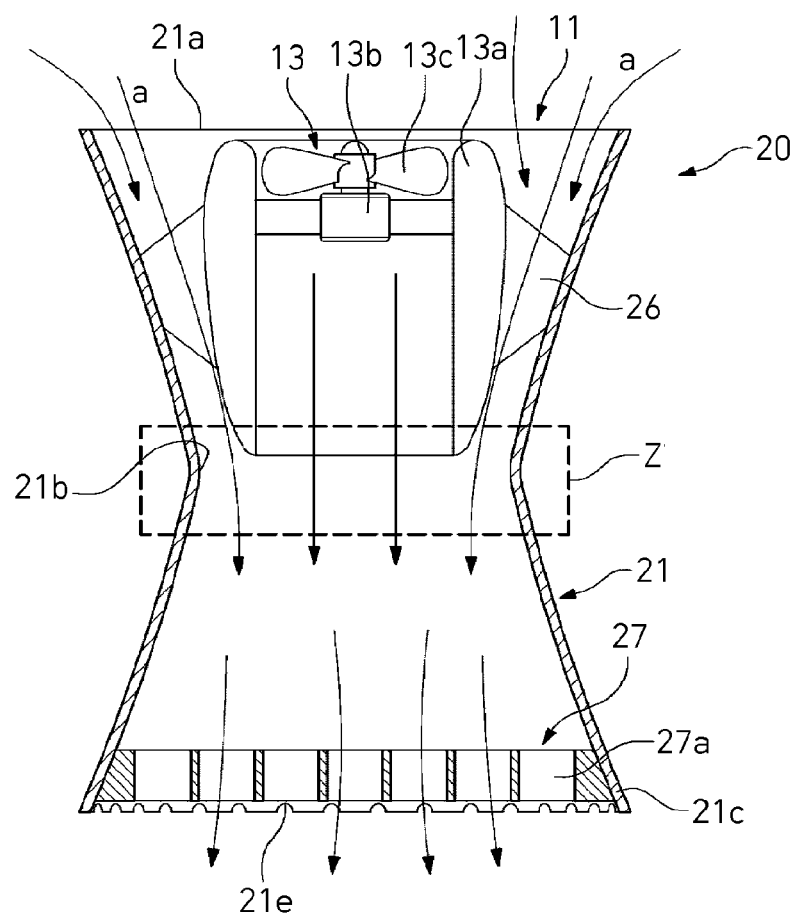

FIGS. 1 and 2 are views for explaining a configuration and an operational principle of a thrust enhancing device 20 according to an embodiment of the present invention. FIG. 1 illustrates that an ejection nozzle 12 is applied as a thrust generation part 11, and FIG. 2 illustrates that a propeller propulsion system 13 is applied as the thrust generation part.

With reference to FIG. 1, the thrust enhancing device 20 is installed in an ejection port 12a of the ejection nozzle 12. The thrust enhancing device 20 includes a venturi part and an ejection induction part.

The venturi part is a first venturi 21 having a cylindrical shape and fixed to the ejection nozzle 12 by means of a plurality of fixing/supporting members 26. The first venturi 21 has an inlet portion 21a, a neck portion 21b, and an outlet portion 21c and accommodates therein the ejection port 12a of the ejection nozzle 12. A basic fluid ejected from the ejection port 12a passes through the neck portion 21b of the first venturi 21 and is discharged to the outside.

In the present description, the 'basic fluid' means a fluid that is ejected by an operation of the thrust generation part 11. In addition, an 'additional fluid' to be described below means a fluid that is sucked into the venturi part from the outside by an action of a pressure drop that occurs when the basic fluid passes through the neck portion of the venturi part.

The inlet portion 21a has a predetermined inner diameter and has a shape spread upward. The inlet portion 21a is spaced apart from an outer peripheral surface of the ejection nozzle 12. A space between the outer peripheral surface of the ejection nozzle 12 and the inlet portion 21a is a passageway through which the additional fluid is introduced.

The neck portion 21b is a streamlined portion having a smaller inner diameter than the inlet portion 21a and the outlet portion 21c and allows the fluid introduced through the inlet portion 21a to pass therethrough. Because the neck portion 21b is narrower in cross-sectional flow area than the inlet portion 21a, the fluid passing through the neck portion 21b accelerates, and an increase in velocity naturally decreases pressure. A portion indicated by reference numeral Z is an approximately low-pressure region portion. The low-pressure region portion refers to a space in which pressure is dropped by acceleration of a fluid. The effect of the low pressure is exerted on the surroundings, which pulls the surrounding fluid in a direction of arrow a.

The additional fluid, which is pulled in the direction of arrow a and introduced into the first venturi 21, is mixed with the basic fluid and discharged through the outlet portion 21c. Compared to a flow rate per unit time ejected from the ejection nozzle 12, a flow rate per unit time ejected through the outlet portion 21c increases. Because an increase in flow rate per unit time is equal to an increase in mass of the fluid, the propulsive force eventually is increased by the operation of the first venturi 21. Naturally, the increased propulsive force comes from the kinetic energy of the additional fluid.

The outlet portion 21c is a passageway through which a mixture of the basic fluid and the additional fluid, i.e., a fluid mixture is discharged, and the outlet portion 21c is spread downward. A diameter of the outlet portion 21c is larger than a diameter of the neck portion 21b. Further, a plurality of noise reducing grooves 21e is formed in a tip portion of the outlet portion 21c. The noise reducing groove 21e serves to reduce noise by lowering shear stress of the fluid ejected through the first venturi 21. Because the principle of the noise reducing groove in the discharge port in the flow field is general, a description thereof will be omitted.

The first venturi 21 eventually allows the basic fluid ejected from the ejection nozzle 12 to pass through the inside thereof, induces a pressure drop in the inside thereof while the basic fluid passes through the inside thereof, sucks the surrounding fluid around the ejection nozzle 12 in to the first venturi 21, and then ejects the surrounding fluid together with the basic fluid, thereby increasing a total ejection flow rate.

The fixing/supporting member 26 is a fixing means that fixes the first venturi 21 to the ejection nozzle 12. The fixing/supporting member 26 may vary in shape or number as long as the fixing/supporting member 26 may fix the first venturi 21.

The ejection induction part is fixed in the outlet portion 21c of the first venturi 21 and serves to linearize a flow of the fluid to be ejected to the outside of the first venturi 21. The ejection induction part includes a direct-ejection inducer 27 having various shapes. For example, the direct-ejection inducer 27 may have shapes illustrated in FIGS. 3A and 3B.

Figure 3A:
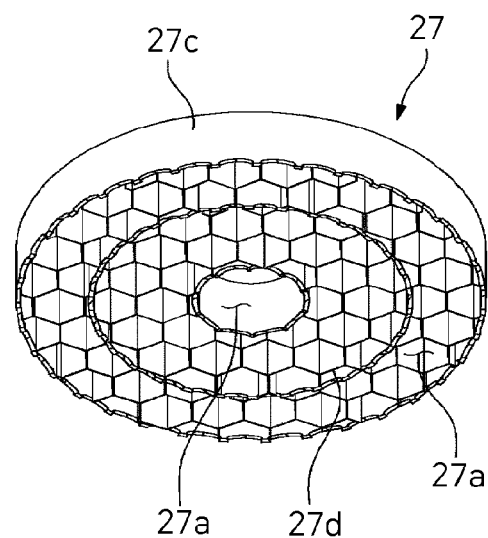
FIGS. 3A and 3B are perspective views separately illustrating a direct-ejection inducer of the thrust enhancing device according to the embodiment of the present invention.

The direct-ejection inducer 27 illustrated in FIG. 3A includes a ring-shaped grid plate casing 27c, and a grid plate member 27d provided in the form of a honeycomb and fixed into the grid plate casing 27c. The grid plate member 27d provides straight ejection passageways 27a through which the fluid passes. The mixture of the basic fluid and the additional fluid flows in the form of a straight streamline while colliding with the grid plate member 27d while passing through the direct-ejection inducer 27. As the ejection direction of the fluid is linearized, it is possible to obtain a maximum output.

Figure 3B:
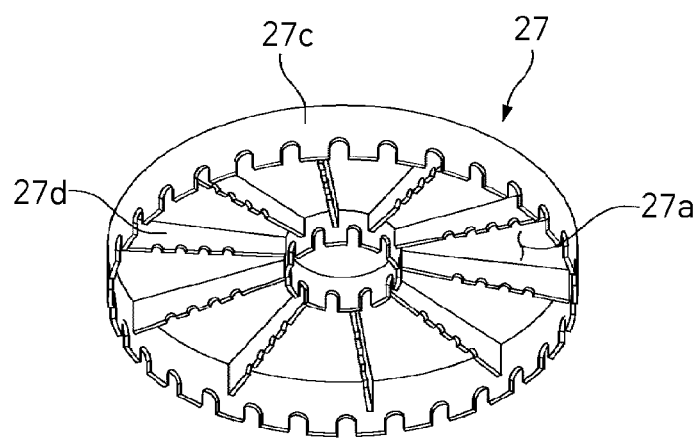

The grid plate member 27d of the direct-ejection inducer 27 in FIG. 3B has a shape extending radially from a central portion of the direct-ejection inducer 27. The grid plate member 27d performs the same function as the grid plate member provided in the form of a honeycomb in FIG. 3A.

Meanwhile, the thrust enhancing device 20 illustrated in FIG. 2 has the propeller propulsion system 13 as the thrust generation part 11. The propeller propulsion system 13 includes a housing 13a, a motor 13b, and a propeller 13c and ejects air toward the low-pressure region portion Z. The fluid ejected from the propeller propulsion system 13 decreases in pressure while passing through the low-pressure region portion Z and draws the fluid around the first venturi 21. The surrounding fluid is drawn in the direction of arrow a and mixed with the basic fluid.

Figure 4:
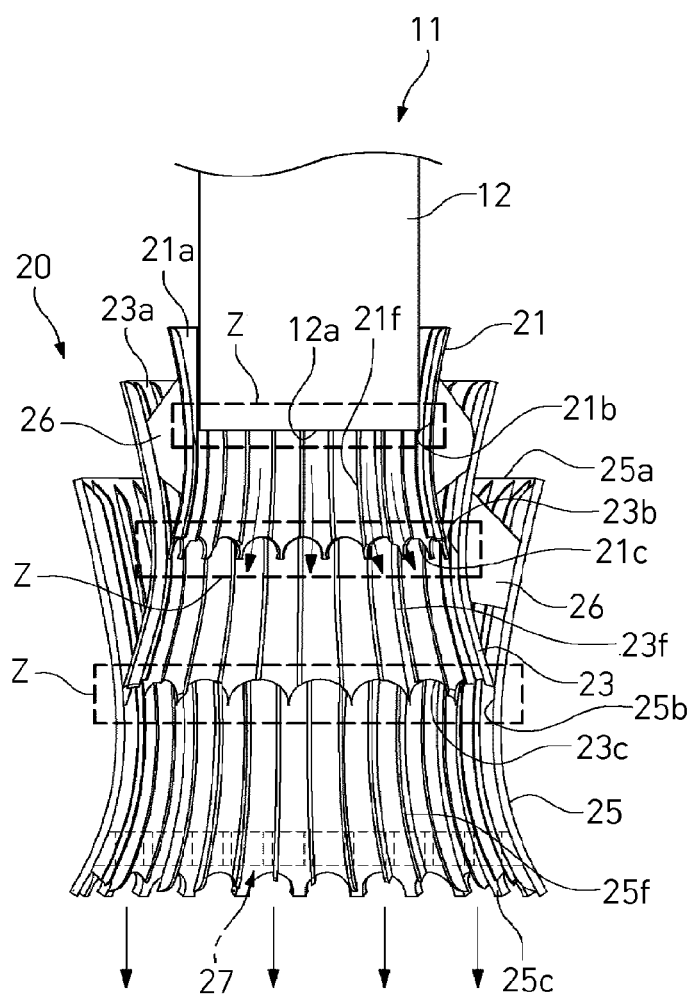
FIG. 4 is a cross-sectional view illustrating a state in which the thrust enhancing device according to the embodiment of the present invention is applied to an ejection nozzle.

FIG. 4 is a cross-sectional view illustrating a state in which the thrust enhancing device 20 according to the embodiment of the present invention is applied to the ejection nozzle.

The thrust enhancing device 20 illustrated in FIG. 4 includes first, second, third venturis 21, 23, and 25, and the direct-ejection inducer 27 fixed to an outlet portion of the third venturi 25. In some instances, the direct-ejection inducer 27 may also be installed in the first venturi 21 and the second venturi 23.

The first venturi 21 accommodates a lower end of the ejection nozzle 12 so that the ejection port 12a is positioned in the neck portion 21b of the first venturi 21. The basic fluid discharged through the ejection port 12a comes into a low-pressure state while passing through the neck portion 21b, and the surrounding fluid is introduced into the first venturi 21 through the inlet portion 21a.

The second venturi 23 has an inlet portion 23a, an outlet portion 23c, and a neck portion 23b and accommodates the first venturi 21 so that the outlet portion 21c of the first venturi is positioned in the neck portion 23b of the second venturi 23. The fluid (the mixture of the basic fluid discharged from the ejection nozzle and the surrounding fluid introduced into the first venturi) ejected from the second venturi 23 comes into a low-pressure state while passing through the neck portion 23b. Therefore, a part of the surrounding fluid around the thrust enhancing device 20 is sucked into the second venturi 23 through the inlet portion 23a.

The third venturi 25 has an inlet portion 25a, an outlet portion 25c, and a neck portion 25b and accommodates the second venturi 23 (of course, the second venturi 23 accommodates the first venturi 21). The third venturi 25 accommodates the second venturi 23 so that the outlet portion 23c of the second venturi 23 is positioned in the neck portion 25b of the third venturi 25. The fluid ejected from the second venturi 23 comes into a low-pressure state while passing through the neck portion 25b. In this case, a part of the surrounding fluid is introduced into the third venturi 25 through the inlet portion 25a.

The fluid passing through the first and second venturis 21 and 23 and the surrounding fluid introduced through the inlet portion 25a are mixed, pass through the direct-ejection inducer 27, and are ejected to the outside. A flow rate per unit time of the fluid discharged through the direct-ejection inducer 27 is naturally higher than a flow rate per unit time of the basic fluid ejected from the ejection nozzle 12. Because the fluid itself has a density, the thrust increases naturally as the flow rate increases.

Stream guiders 21f, 23f, and 25f are respectively formed on inner wall surfaces of the first, second, and third venturis 21, 23, and 25. The stream guiders 21f, 23f, and 25f may each serve to guide a flow of the fluid passing through each of the venturis. The stream guiders 21f, 23f, and 25f may be formed in parallel with the flow direction of the fluid or formed spirally.

The ejection nozzle 12, the first venturi 21, the second venturi 23, and the third venturi 25 are kept fixed by the plurality of fixing/supporting members 26. Further, FIG. 4 illustrates that the three venturis are applied. However, the number of venturis to be applied may vary, as necessary. For example, only one venturi or two venturis may be applied, or four or more venturis may be applied.

Figure 5:
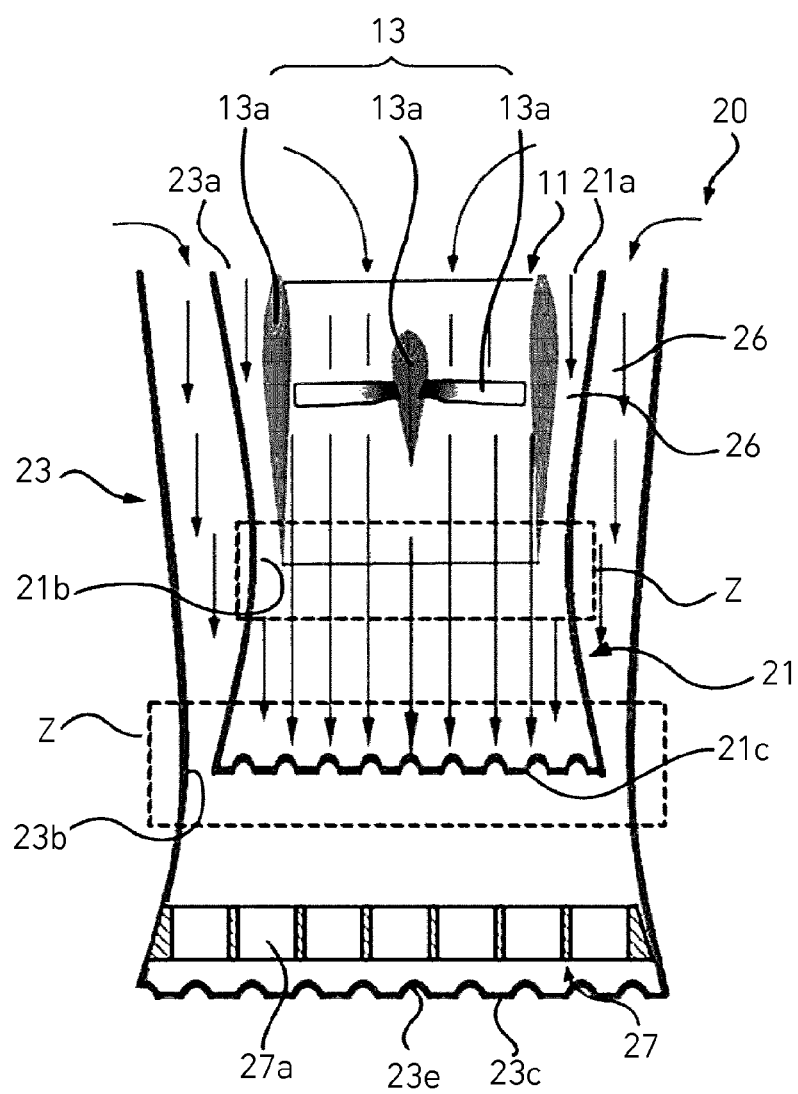
FIG. 5 is a view illustrating a state in which the thrust enhancing device according to the embodiment of the present invention is applied to a propeller propulsion system.

FIG. 5 is a view illustrating a state in which the thrust enhancing device 20 according to the embodiment of the present invention is applied to a propeller propulsion system.

Hereinafter, the reference numerals identical to the above-mentioned reference numerals indicate the same members having the same functions, and a repeated description thereof will be omitted.

As illustrated, the second venturi 23 is provided outside the first venturi 21 that accommodates the propeller propulsion system 13. The outlet portion 21c of the first venturi 21 is positioned in the neck portion 23b of the second venturi 23. The fluid having passed through the first venturi 21 comes into a low-pressure state while passing through the neck portion 23b of the second venturi 23. Therefore, the surrounding fluid is introduced into the inlet portion 23a of the second venturi 23 and then ejected to the outside via the neck portion 23b. Of course, the thrust increases in response to the flow energy of the introduced surrounding fluid. As described above, the portion indicated by Z in the drawing is the low-pressure region.

Figure 6:
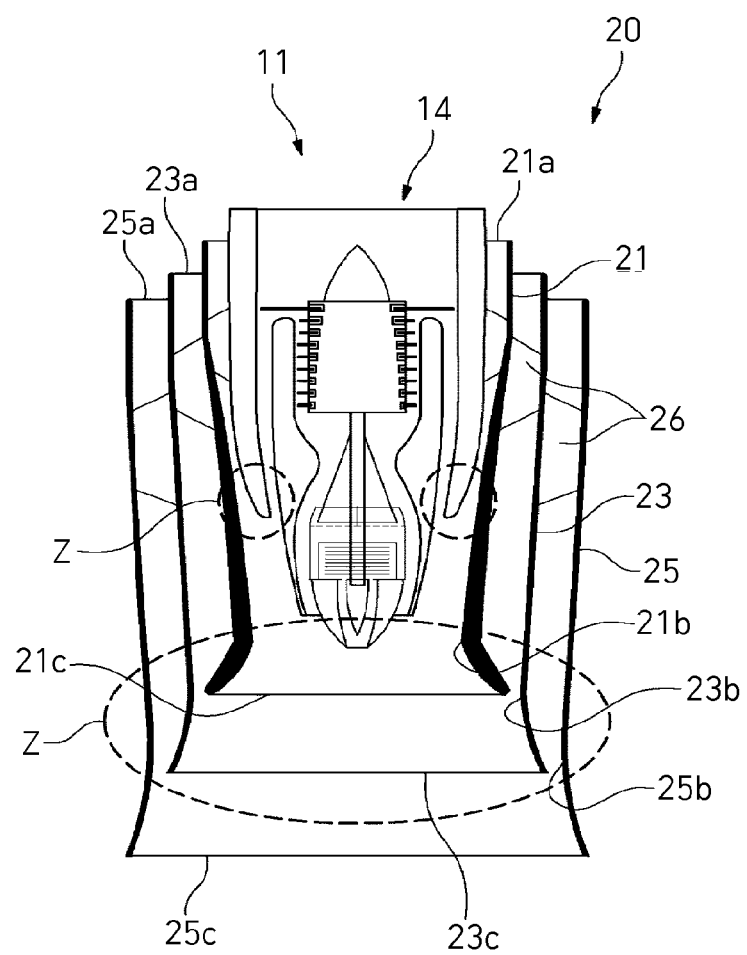
FIGS. 6 to 8 are views illustrating states in which the thrust enhancing device according to the embodiment of the present invention is applied to a jet engine.

FIG. 6 is a view illustrating a state in which the thrust enhancing device 20 according to the embodiment of the present invention is applied to a jet engine 14. The direct-ejection inducer 27 is omitted from FIGS. 6 to 8.

The jet engine 14 obtains a propulsive force by sucking, compressing, and exploding air existing at a front side based on a traveling direction. The basic fluid ejected from the jet engine 14 sequentially passes through the neck portion 21b of the first venturi 21, the neck portion 23b of the second venturi 23, and the neck portion 25b of the third venturi 25 and then is ejected to the outside. The basic fluid ejected from the jet engine 14 is heated gas, and the basic fluid and the surrounding fluid introduced through the inlet portions 21a, 23a, and 25a are mixed and then ejected. As described above, an effect of enhancing thrust is generated as much as the increased flow rate of the fluid.

Figure 7:
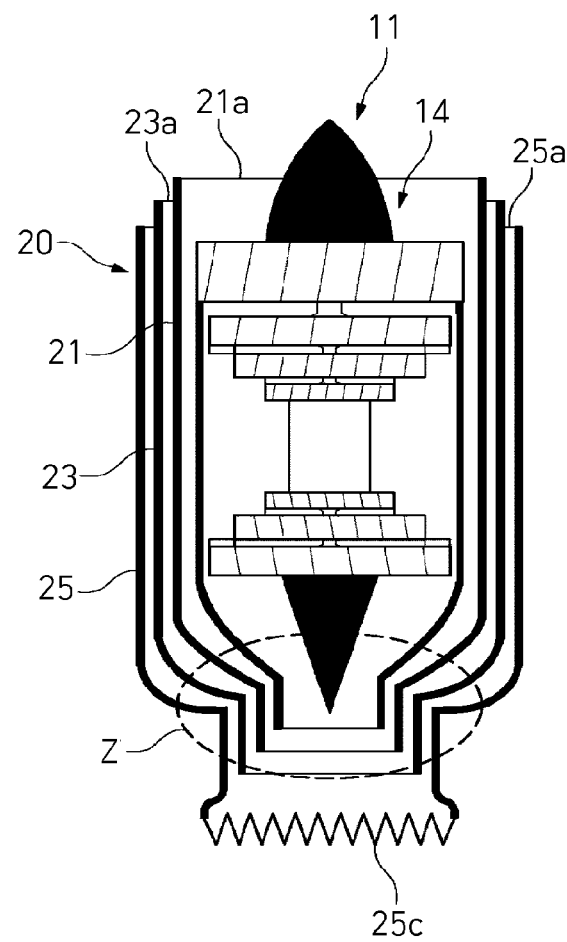
Figure 8:
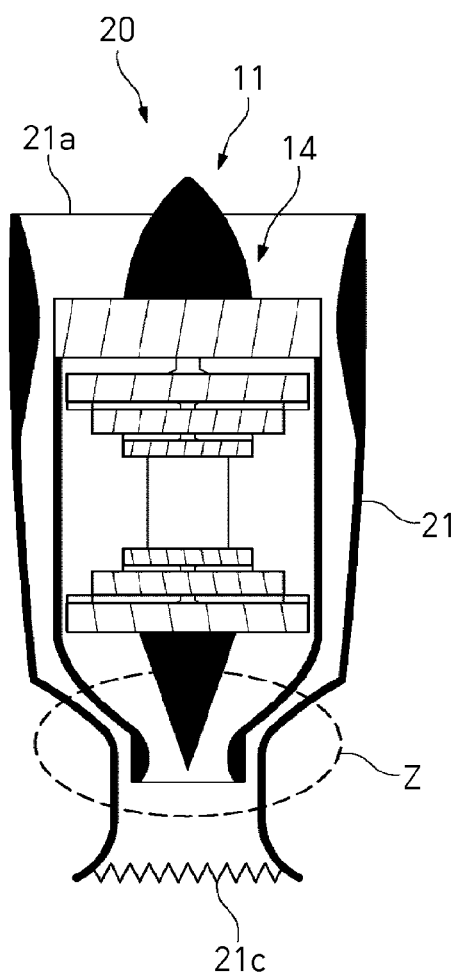

FIGS. 7 and 8 are views schematically illustrating the thrust enhancing device 20 applied to the jet engine 14. The thrust enhancing device 20 in FIG. 7 adopts the first, second, and third venturis 21, 23, and 25, and the thrust enhancing device 20 in FIG. 8 adopts the first venturi 21.

The venturi illustrated in FIGS. 7 and 8 is different in shape from the venturi in FIG. 6, but the venturis are identical in the principle of forming the low-pressure region portion Z in the outlet portion and the way to enhance the thrust.

Figure 9:
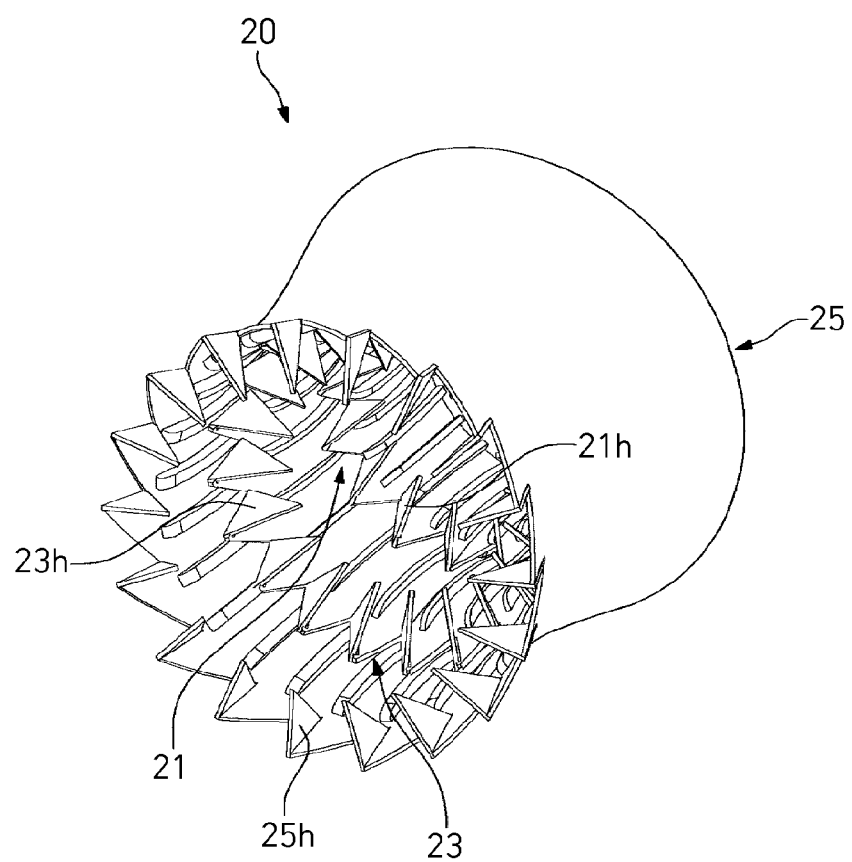
FIGS. 9 and 10 are views for explaining a detailed configuration of the thrust enhancing device according to the embodiment of the present invention.
Figure 10:
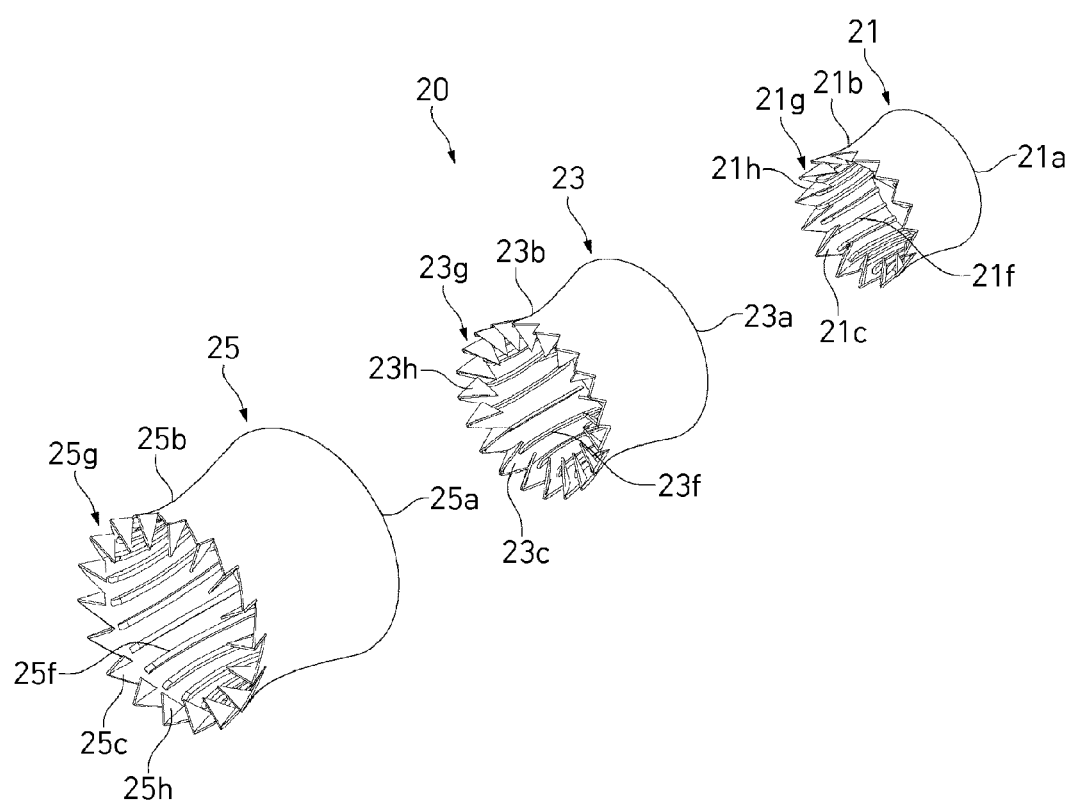

FIG. 9 is a view illustrating a modified example of the thrust enhancing device 20 according to the embodiment of the present invention, and FIG. 10 is an exploded perspective view of the thrust enhancing device 20 in FIG. 9.

The thrust enhancing device 20 illustrated in FIGS. 9 and 10 includes the first, second, and third venturis 21, 23, and 25 respectively integrated with ejection induction parts 21g, 23g, and 25g.

That is, the first venturi 21 has the inlet portion 21a, the neck portion 21b, and the outlet portion 21c, and the ejection induction part 21g is formed in the outlet portion. The second venturi 23 also has the inlet portion 23a, the neck portion 23b, and the outlet portion 23c and has the ejection induction part 23g provided in the outlet portion 23c. Likewise, the third venturi 25 also has the inlet portion 25a, the neck portion 25b, and the outlet portion 25c and is integrated with the ejection induction part 25g provided in the outlet portion 25c.

The ejection induction part 21g of the first venturi 21 has a plurality of bent blades 21h formed by cutting an end of the ejection induction part at the side of the outlet portion 21c, cutting the end of the ejection induction part at predetermined intervals in a circumferential direction, and bending cut-out portions toward the inside of the flow field. The bent blades 21h guide the flow of the basic fluid having passed through the neck portion 21b and smoothly mix the basic fluid with the surrounding fluid sucked by the second venturi 23.

In addition, the ejection induction part 23g of the second venturi 23 has a plurality of bent blades 23h formed by cutting an end of the ejection induction part at the side of the outlet portion 23c, cutting the end of the ejection induction part at predetermined intervals in a circumferential direction, and bending cut-out portions toward the inside of the flow field. The bent blades 23h guide the flow of the fluid having passed through the neck portion 23b and smoothly mix the fluid with the surrounding fluid sucked by the third venturi 25.

The ejection induction part 25g of the third venturi 25 has the same structure. That is, a plurality of bent blades 25h is formed by cutting an end of the ejection induction part at the side of the outlet portion 25c, cutting the end of the ejection induction part at predetermined intervals in a circumferential direction, and bending cut-out portions toward the inside of the flow field. The bent blades 25h guide all the flows of the fluid having passed through the third venturi so that the fluid flows rectilinearly.

In case that the ejection induction parts 21g, 23g, and 25g are applied, the above-mentioned direct-ejection inducer 27 may be excluded, thereby further reducing the weight of the thrust enhancing device.

As illustrated in FIG. 4, the first, second, and third venturis 21, 23, and 25 has an arrangement structure in which the first venturi 21 is accommodated in the second venturi 23, and the second venturi 23 is accommodated in the third venturi 25.

Figure 11:
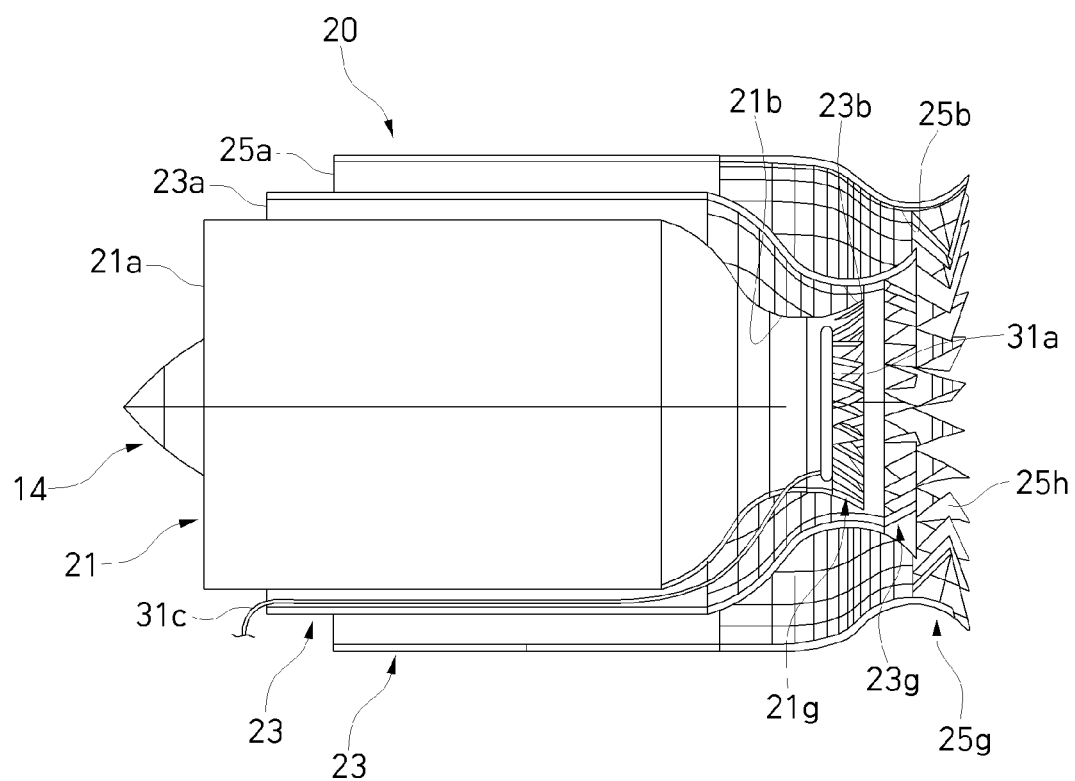
FIGS. 11 and 12 are views illustrating another example of the thrust enhancing device according to the embodiment of the present invention.
Figure 12:
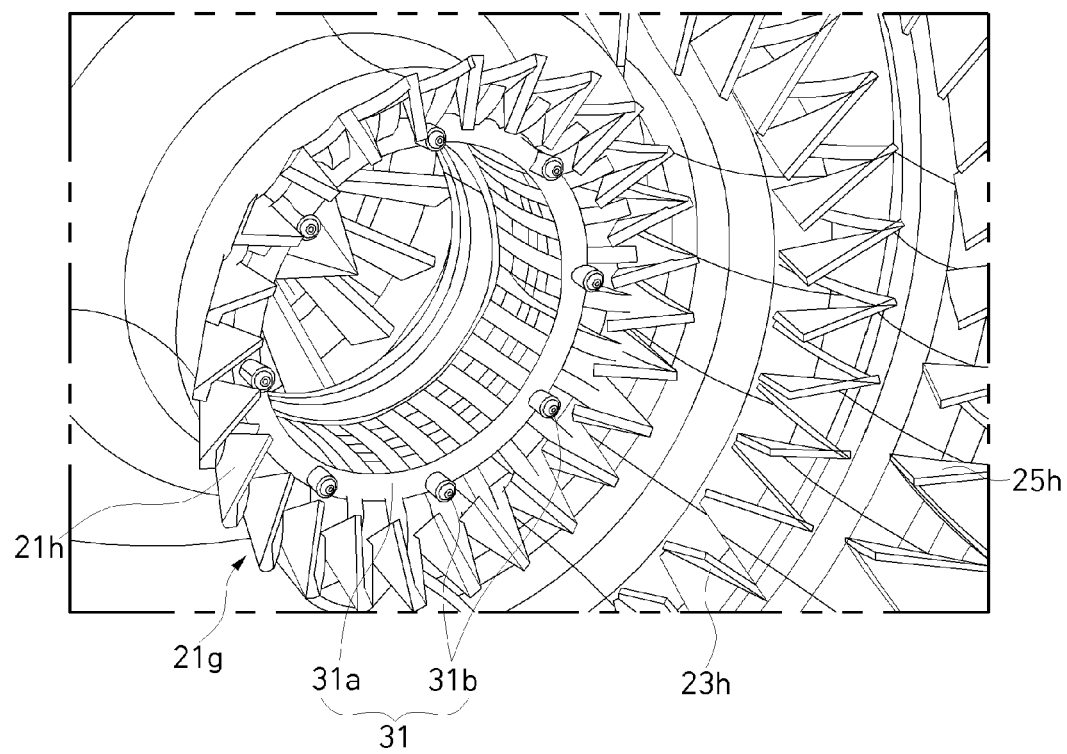

FIGS. 11 and 12 are views illustrating another example of the thrust enhancing device 20 according to the embodiment of the present invention.

As illustrated, the jet engine 14 is mounted in the first venturi 21. The jet engine 14 is a turbo-fan jet engine. The turbo-fan jet engine is an engine having two separate air passageways. One air flow is connected to a combustion chamber, and the other air flow bypasses the combustion chamber. In the turbo-fan jet engine, thrust is made by summing up high-temperature flow thrust obtained by exploding compressed air in the combustion chamber and thrust made by a bypass flow.

A flow velocity of the bypass flow, which bypasses the combustion chamber, is relatively lower than a velocity of a fluid ejected from the combustion chamber. However, because a flow rate of air is high, thrust may be generated.

The second venturi 23 is disposed outside the first venturi 21 that accommodates the jet engine 14. The third venturi 25 is disposed outside the second venturi 23, and a water injection part 31 is provided inside the outlet portion of the first venturi 21. The functions and structures of the first, second, and third venturis 21, 23, and 25 are identical to those described above.

The water injection part 31 may include a ring-shaped pipe 31a and a plurality of water injector nozzles 31b. The ring-shaped pipe 31a serves to receive and accommodate water supplied from the outside through a water supply pipe 31c and guide the water to the water injector nozzles 31b. A support bracket having an appropriate shape may be applied to fix the ring-shaped pipe 31a to the first venturi 21.

The water injector nozzles 31b eject rearward the water supplied through the ring-shaped pipe 31a. The ejected water is vaporized and expanded by receiving heat from a jet gas ejected from the jet engine 14. As known, water expands by 1,700 times or more at a heating temperature of 100° C., by 2,400 times or more at 260° C., and by 4,200 times or more at 650° C.

The thrust is further enhanced by the addition of water vapor expanded by ejecting water as described above. That is, because the vaporized water vapor is additionally ejected in addition to the jet gas ejected from the jet engine 14 and the additional fluid sucked into the thrust enhancing device 20, the effect of enhancing thrust is improved as a large amount of fluid is ejected in comparison with a case in which only the jet engine ejects jet gas. The structure of the water injection part 31 or the injection method may vary as much as needed as long as the water injection part 31 may eject water. Further, the water injection part 31 may also be applied to other types of jet engines in addition to the turbo-fan jet engine.

Figure 13:
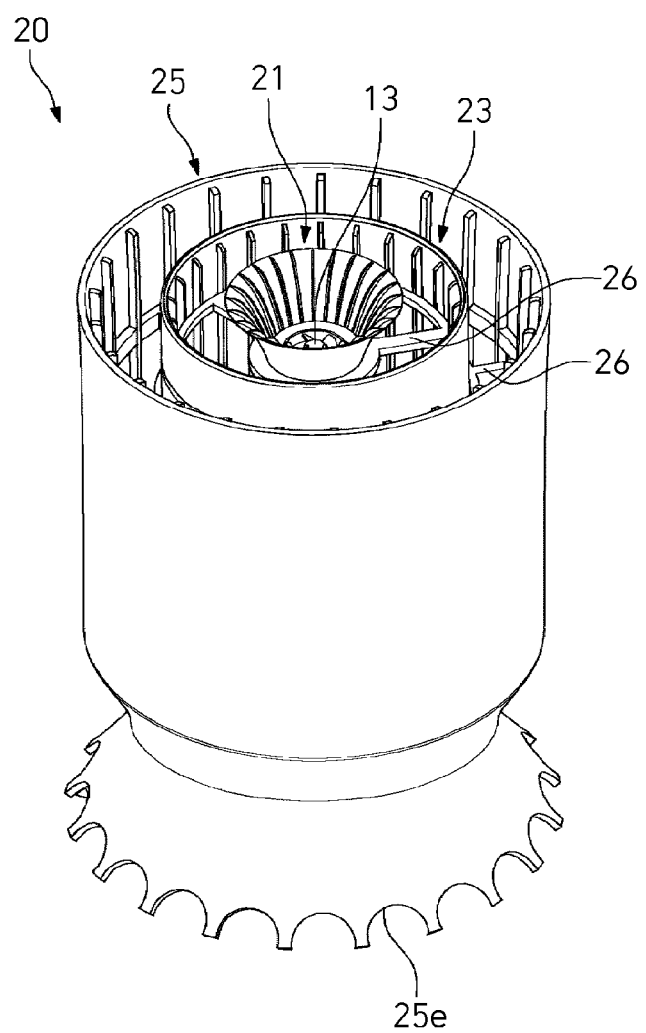
FIGS. 13 to 15 are views illustrating still another example of the thrust enhancing device according to the embodiment of the present invention.
Figure 14:
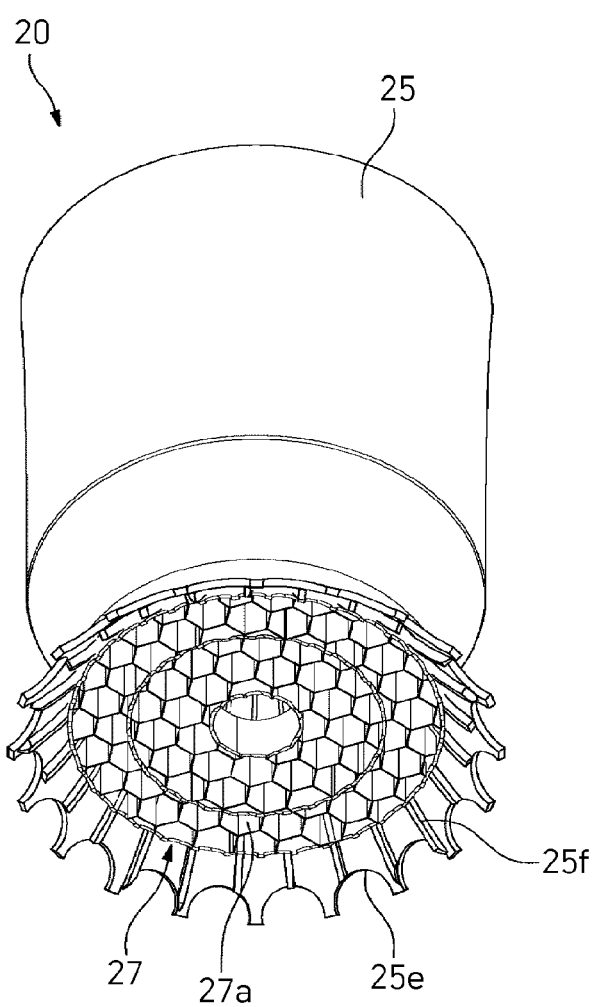
Figure 15:
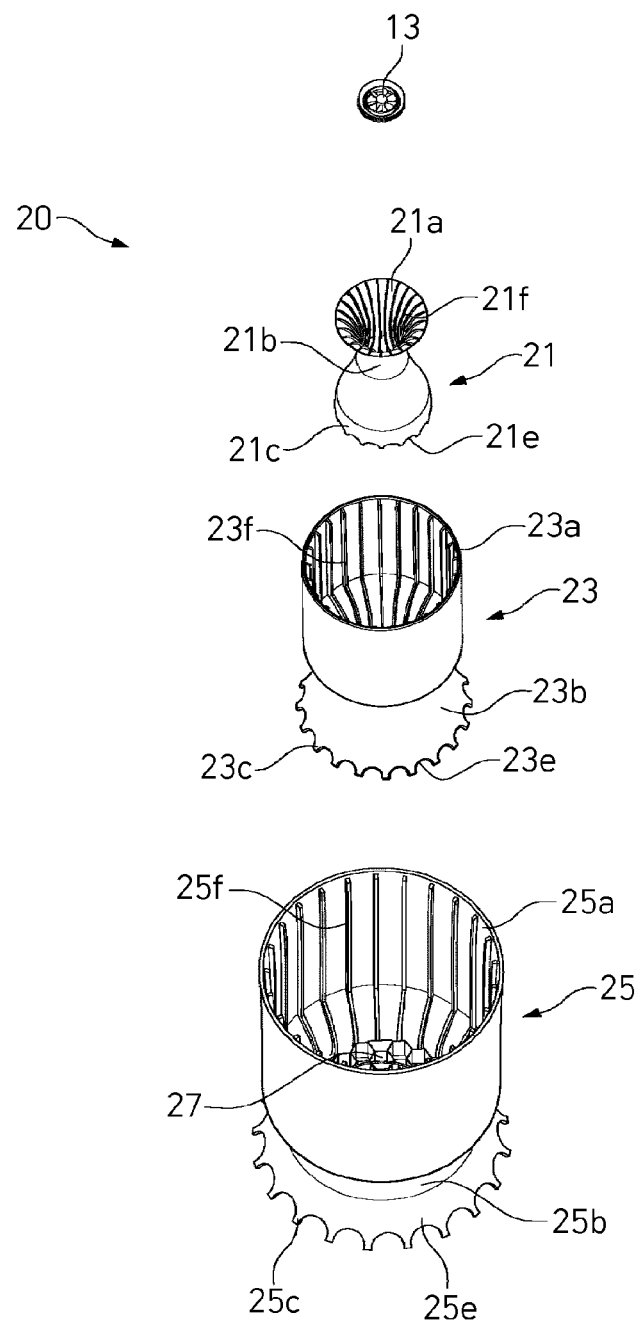

FIGS. 13 to 15 are views illustrating still another example of the thrust enhancing device 20 according to the embodiment of the present invention.

As illustrated, the thrust enhancing device 20 accommodates the propeller propulsion system 13. The configuration in which the flow, which is generated when the propeller propulsion system 13 operates, comes into a low-pressure state while sequentially passing through the first, second, and third venturis 21, 23, and 25 and draws an outside fluid is identical to that described above.

As described with reference to FIG. 2, the propeller propulsion system 13 includes the housing, the motor, and the propeller and outputs thrust from a reaction force made by a rotation of the propeller. The propeller propulsion system 13 is installed inside the inlet portion of the first venturi 21. The basic fluid generated in the propeller propulsion system 13 comes into a low-pressure state while passing through the neck portion 21b of the first venturi 21, and the basic fluid and the surrounding fluid introduced through the inlet portion 21a from the outside are mixed and then discharged from the outlet portion 21c.

The plurality of noise reducing grooves 21e is formed at an end at a side of the outlet portion 21c of the first venturi 21. As described above, the noise reducing grooves 21e serve to reduce noise caused by the fluid ejected through the first venturi 21.

The second venturi 23 accommodates and fixes the first venturi 21 so that the outlet portion 21c of the first venturi 21 is positioned in the neck portion 23b of the second venturi 23. Noise reducing grooves 23e are also formed at a lower end of the second venturi 23. The noise reducing grooves 23e reduce noise of the fluid having passed through the second venturi 23.

The third venturi 25 accommodates the second venturi 23 so that the outlet portion 23c of the second venturi 23 is positioned in the neck portion 25b of the third venturi 25. Noise reducing grooves 25e are also provided at a lower end of the third venturi 25. The noise reducing grooves 25e reduce noise of the fluid ejected from the third venturi 25.

The propeller propulsion system 13 and the first venturi 21 are coupled to each other by the fixing/supporting members 26, and the first, second, and third venturis 21, 23, and 25 are coupled to one another by the fixing/supporting members 26.

Further, the direct-ejection inducer 27 is installed inside the outlet portion 25c of the third venturi 25. The direct-ejection inducer 27 linearizes the flow of the fluid to be ejected from the third venturi 25.

Figure 16:
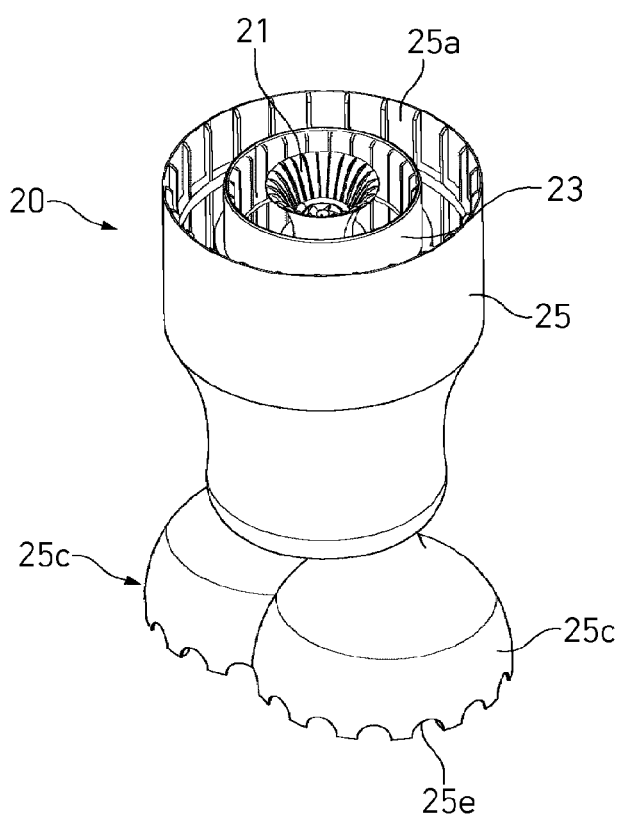
FIGS. 16 to 18 are views for explaining yet another example of the thrust enhancing device according to the embodiment of the present invention.
Figure 17:
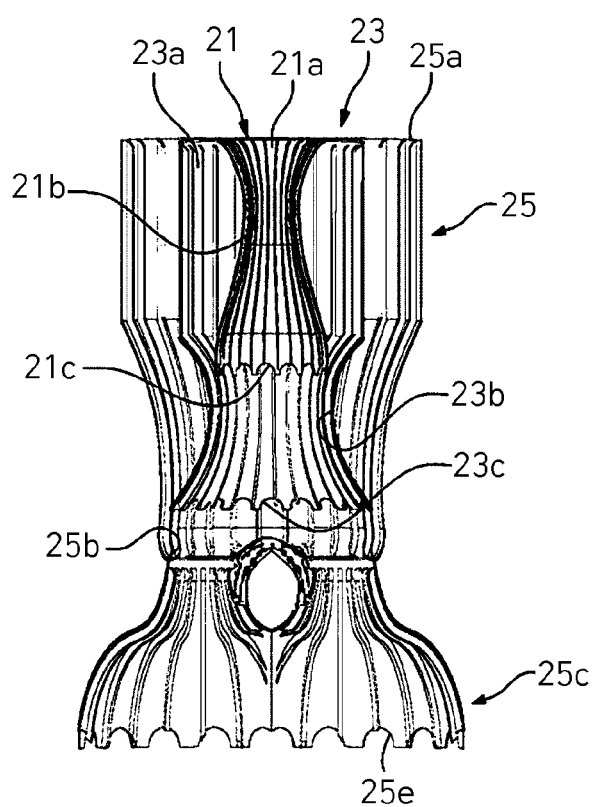

FIG. 16 is a perspective view for explaining yet another example of the thrust enhancing device 20 according to the embodiment of the present invention, and FIG. 17 is a cross-sectional view illustrating shapes of the first, second, and third venturis 21, 23, and 25 of the thrust enhancing device in FIG. 16. In addition, FIG. 18 is a view illustrating the direct-ejection inducer 27 and the outlet portion 25c of the third venturi 25.

Figure 18:
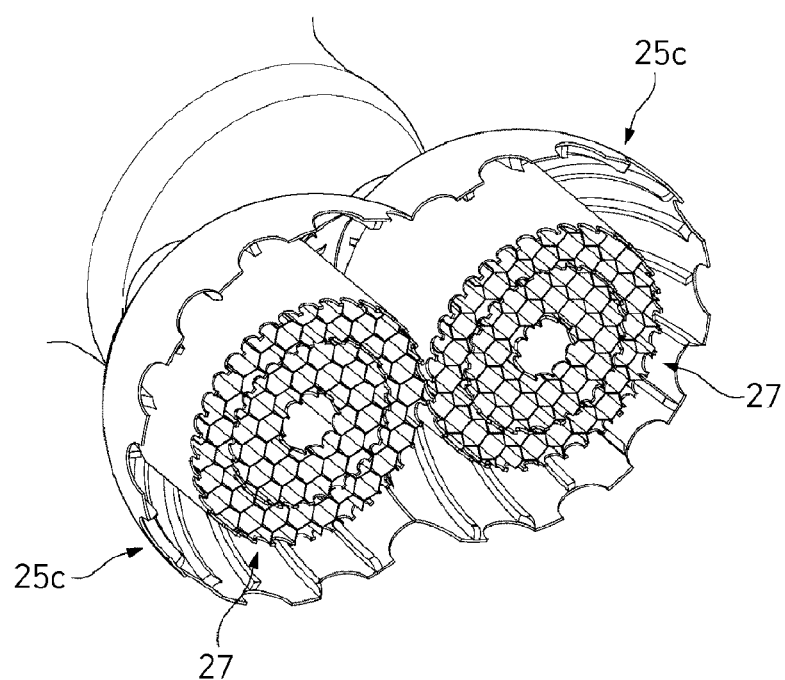

The third venturi 25 of the thrust enhancing device 20 illustrated in FIGS. 16 to 18 has the inlet portion 25a, the neck portion 25b, and the outlet portions 25c, and the outlet portions 25c have a parallel structure. That is, the two outlet portions 25c are disposed in parallel with each other in a leftward/rightward direction. The flow of the fluid having passed through the neck portion 25b of the third venturi 25 is divided into two flows, and the two flows pass through the two outlet portions 25c and then are ejected to the outside. Further, the direct-ejection inducer 27 is mounted in each of the outlet portions 25c and guides the flow of the fluid to be ejected.

FIG. 16 illustrates that the two outlet portions 25c. are applied, but three or more outlet portions 25c may be applied, as necessary.

Figure 19:
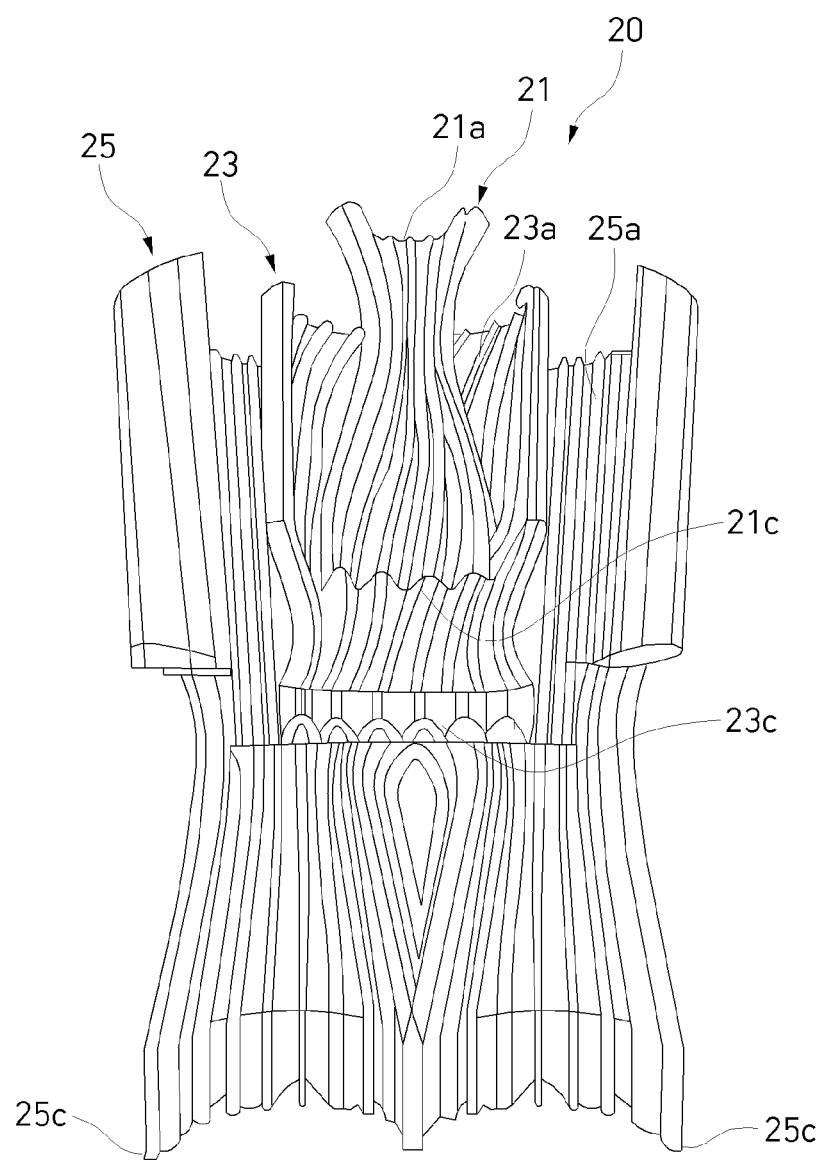
FIG. 19 is a view illustrating another modified example of the thrust enhancing device according to the embodiment of the present invention.

FIG. 19 is a cross-sectional view illustrating still another modified example of the thrust enhancing device 20 according to the embodiment of the present invention.

The two outlet portions 25c are applied to the third venturi 25 of the thrust enhancing device 20 illustrated in FIG. 19. A length from the neck portion 25b to the outlet portion 25c is longer than that of the third venturi in FIG. 16. As described above, because the length increases, it is possible to exclude the direct-ejection inducer 27 through which the flow having passed through the neck portion 25b flows toward the outlet portion 25c.

Figure 20A:
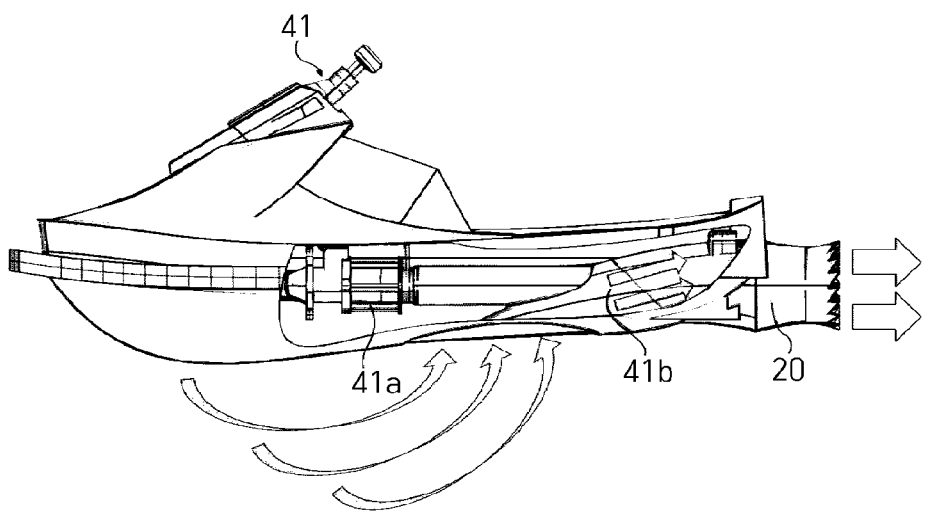
FIGS. 20A and 20B are views illustrating states in which the thrust enhancing device according to the embodiment of the present invention is applied to a jet ski.
Figure 20B:
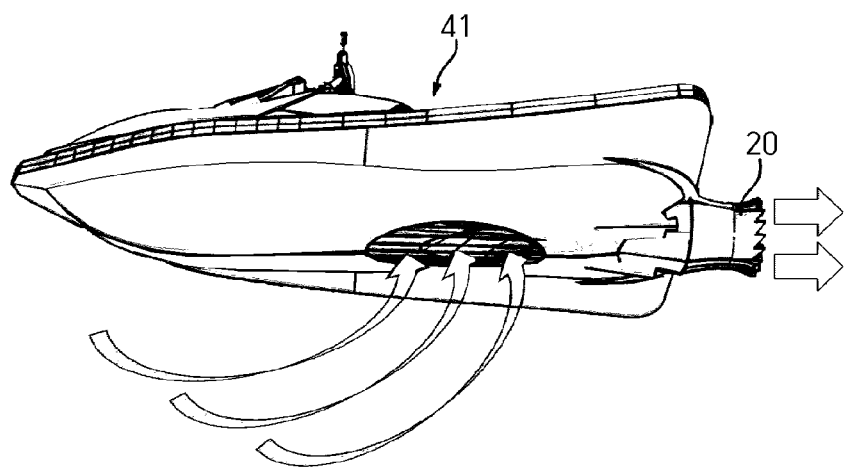

FIGS. 20A and 20B are views illustrating states in which the thrust enhancing device 20 according to the embodiment of the present invention is applied to a jet ski 41.

With reference to the drawings, the thrust enhancing device 20 is installed in an ejection port of an inner passageway 41b provided in the jet ski 41. The configuration for fixing the thrust enhancing device 20 to the ejection port may be implemented, as much as needed, by using an appropriate fixing means by using a bracket or the like.

The jet ski 41 obtains a propulsive force by using a driving part 41a and an impeller (not illustrated) and has the inner passageway 41b. The inner passageway is a passageway through which water, which will generate a reaction force, passes. One end of the inner passageway is opened toward a lower portion of a bottom of the jet ski, and the other end of the inner passageway is opened rearward. The other end of the inner passageway is the ejection port through which water is ejected. The impeller (not illustrated) is installed in the inner passageway 41b.

When the impeller is rotated by using the driving part 41a, the water existing in the lower portion of the jet ski is pumped by the operation of the impeller, and the water passes through the inner passageway 41b and is ejected toward a rear side of the jet ski. The jet ski 41 is propelled by a reaction force generated in this case.

The thrust enhancing device 20 of the present embodiment is mounted in the ejection port of the inner passageway 41b. The water (basic fluid), which passes through the inner passageway and is ejected rearward by the impeller, comes into a low-pressure state while passing through the neck portion in the thrust enhancing device 20. In this case, the surrounding water (additional fluid) is sucked into the thrust enhancing device 20 and ejected rearward. The water ejected from the thrust enhancing device 20 is water made by mixing the water ejected by the impeller and the water sucked into the thrust enhancing device 20. The flow rate of the water discharged through the thrust enhancing device 20 increases in comparison with the flow rate of the water pumped by the impeller, such that the momentum and the propulsive force increase.

The thrust enhancing device 20 illustrated in FIGS. 20A and 20B may adopt the single first venturi 21 or adopt the first and second venturis 21 and 23. Alternatively, the thrust enhancing device 20 may have a combination of the first, second, and third venturis 21, 23, and 25.

Figure 21A:
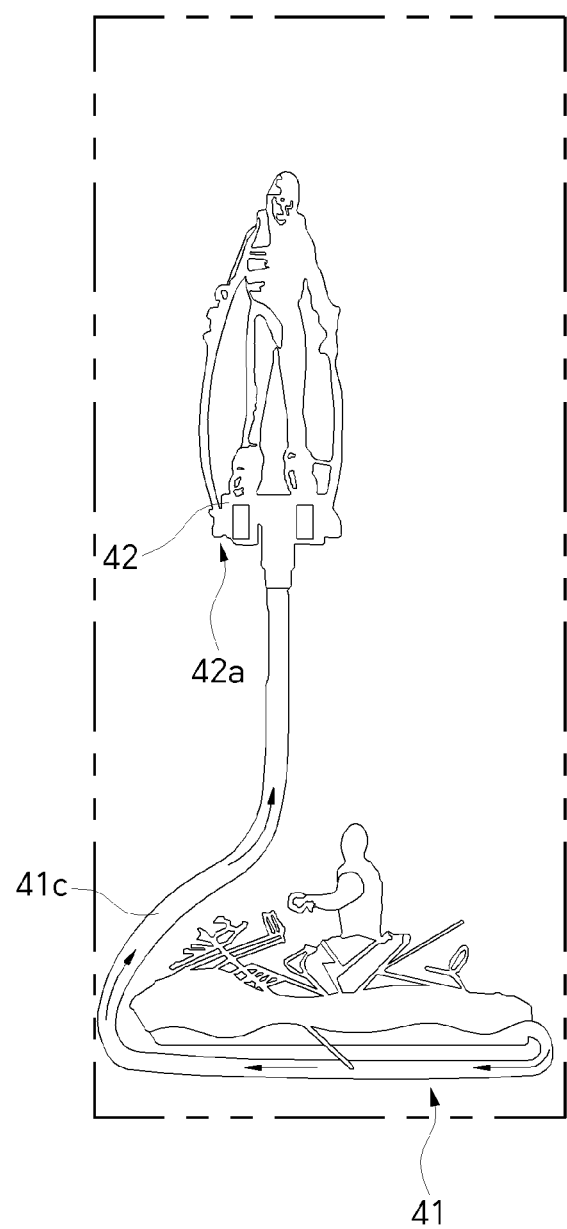
FIG. 21A is a view illustrating a hydro jetpack and a skyboard in the related art.
Figure 21B:
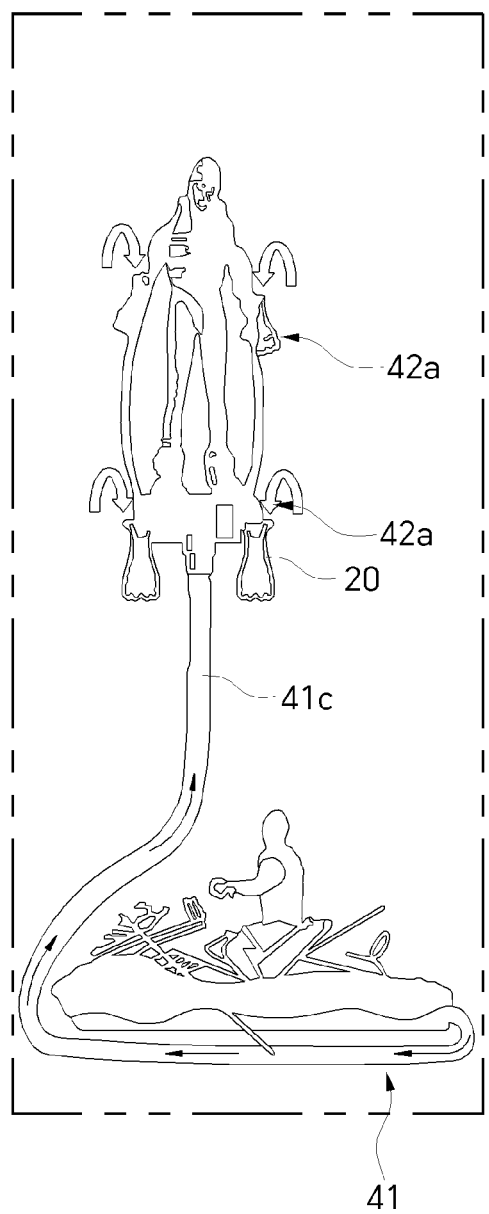
FIG. 21B is a view illustrating a hydro jetpack and a skyboard to which a thrust enhancing device 20 according to the embodiment of the present invention is applied.

FIG. 21A is a view illustrating a hydro jetpack and a skyboard in the related art, and FIG. 21B is a view illustrating a hydro jetpack and a skyboard to which the thrust enhancing device 20 according to the embodiment of the present invention is applied.

As illustrated, a general hydro jetpack and a skyboard 42 are each provided in the form of a plate on which a user may be placed, and have an ejection nozzle 42a at a lower side thereof. Ejection nozzles 42a are connected to the jet ski 41 through a hose 41c. Water pumped from the jet ski 41 is supplied to the ejection nozzle 42a through the hose 41c and ejected toward a lower side of the ejection nozzle 42a, thereby providing a reaction force. The hydro jetpack and the skyboard 42 support and lift the user by using the reaction force of the water ejected from the ejection nozzle.

With reference to FIG. 21B, it can be seen that the thrust enhancing device 20 is mounted in the ejection nozzle 42a. The configuration for fixing the thrust enhancing device 20 to the ejection nozzle 42a may be implemented as much as needed by means of any fixing means (not illustrated) including a fixing bracket.

The thrust enhancing device 20 sucks the surrounding air on the basis of the venturi principle while allowing the water ejected from the ejection nozzle 42a to pass through a lower portion thereof. As the air around the thrust enhancing device 20 is introduced into the thrust enhancing device 20, a final ejection flow rate of the fluid ejected from the thrust enhancing device 20 increases, and thus overall thrust increases.

Figure 22:
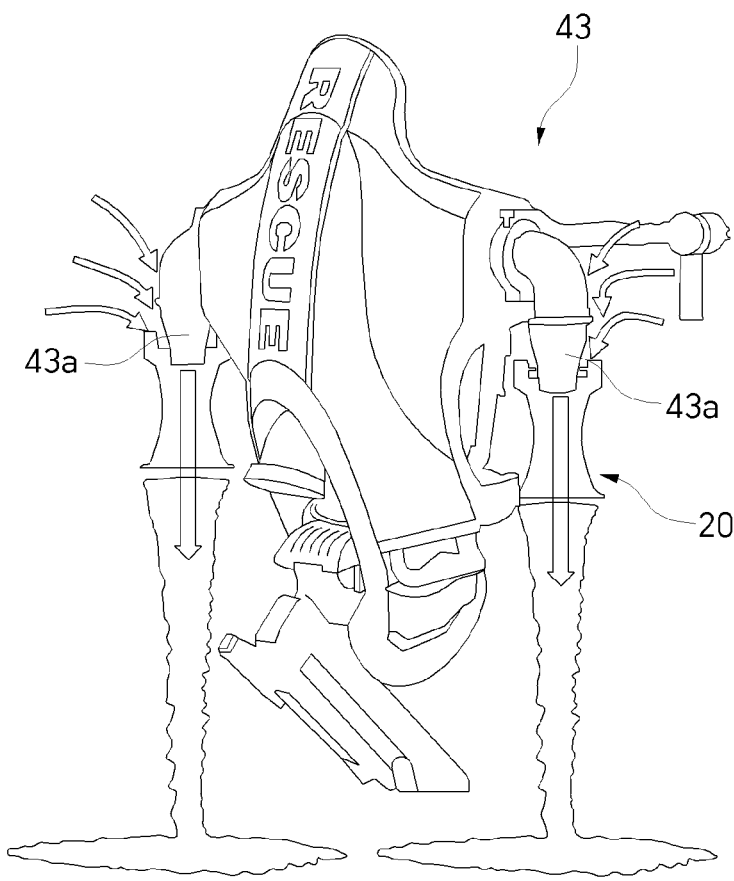
FIG. 22 is a view illustrating an example in which the thrust enhancing device according to the embodiment of the present invention is installed on a jetpack so that the thrust enhancing device is strapped to a user's back.

FIG. 22 is a view illustrating an example in which the thrust enhancing device 20 according to the embodiment of the present invention is installed on a jetpack 43.

The jetpack 43 is a hydro water sports device that a user wears on his/her back as if he/she wears a backpack. Water supplied from the outside through a hose lifts the jetpack 43 while being ejected downward through ejection nozzles 43a.

As illustrated, the thrust enhancing device 20 of the present embodiment is mounted in the ejection nozzle 43a and sucks the surrounding air while allowing the water ejected from the ejection nozzle 43a to pass therethrough. As described above, the configuration for fixing the thrust enhancing device 20 to the ejection nozzle 43a may be implemented by means of an appropriate fixing means.

The sucked air is an additional fluid, the sucked air and the water are mixed and then ejected downward. In this case, the air around the thrust enhancing device 20 is introduced into the thrust enhancing device 20, a final ejection flow rate of the fluid ejected from the thrust enhancing device 20 increases, and thus overall thrust increases.

Figure 23:
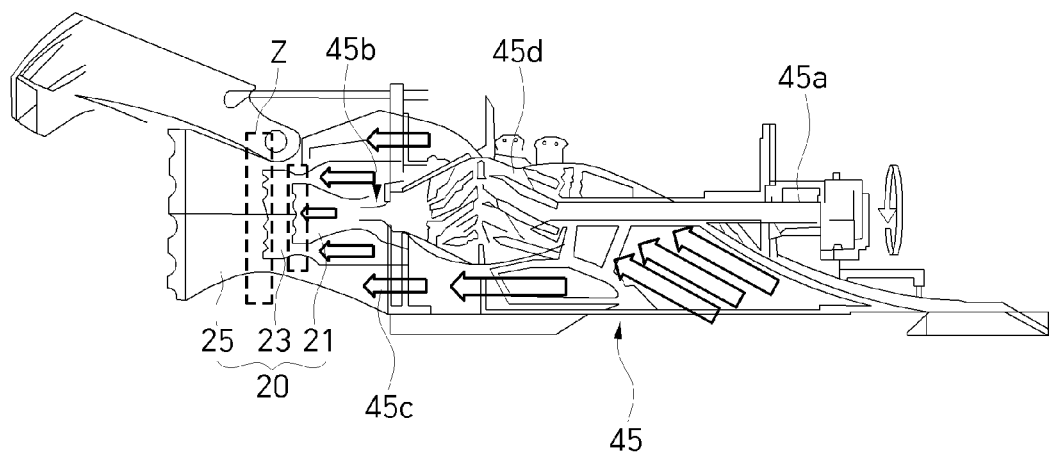
FIG. 23 is a view illustrating a state in which the thrust enhancing device according to the embodiment of the present invention is applied to a jet boat driving part.

FIG. 23 is a view illustrating a state in which the thrust enhancing device according to the embodiment of the present invention is applied to a jet boat driving part 45. The jet boat driving part 45 is a part mounted at a stern of a jet board and configured to provide a propulsive force. The jet board driving part 45 is identical in operational principle to the jet ski described with reference to FIG. 20.

As illustrated, the thrust enhancing device 20 is installed rearward of an ejection nozzle 45b of the jet boat driving part 45. An impeller 45d is positioned in the ejection nozzle 45b and rotated by a rotational force transmitted from an impeller shaft 45a, thereby ejecting water rearward through the ejection nozzle 45b.

When the impeller 45d operates, water in the jet boat driving part is sucked upward, passes through the ejection nozzle 45b, and then is discharged rearward via the thrust enhancing device 20. The surrounding fluid is introduced into the thrust enhancing device 20 through an inflow passageway 45c while the water passes through the thrust enhancing device 20, thereby enhancing thrust.

Figure 24A:
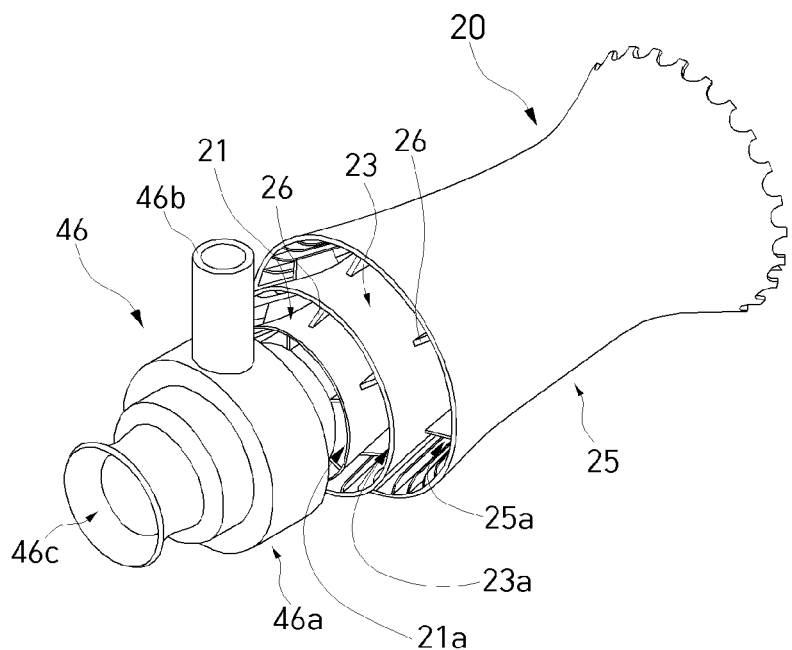
FIGS. 24A and 24B are perspective views of an air amplification device using the thrust enhancing device according to the embodiment of the present invention.
Figure 24B:
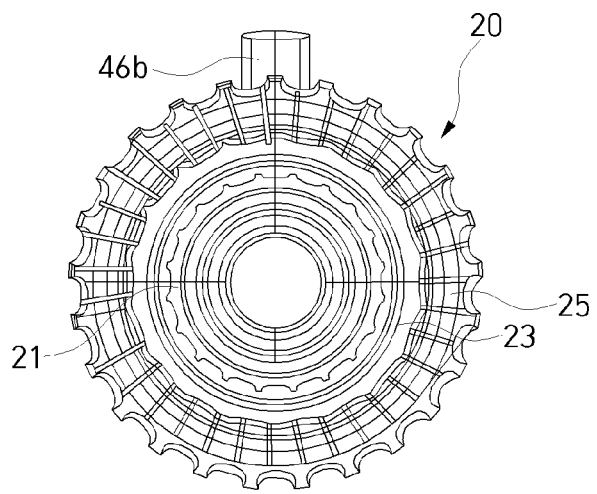

FIGS. 24A and 24B are views illustrating an air amplification device 46 using the thrust enhancing device according to the embodiment of the present invention. FIG. 24B is a view illustrating the air amplification device in FIG. 24A when viewed from the rear side.

As illustrated, the thrust enhancing device 20 may be coupled to the air amplification device 46 and improve performance of the air amplification device 46. The air amplification device 46 includes an air casing 46a, an air supply tube 46b, an inlet port 46c, and an outlet port 46e. When air is forcibly introduced into the air supply tube 46b, outside air is introduced into the inlet port 46c on the basis of the Venturi effect. The air sucked into the air casing 46a through the inlet port 46c is mixed with the air introduced through the air supply tube 46b, and the mixed air is ejected to the first venturi 21 through the outlet port 46e.

The air discharged through the outlet port 46e passes through the second venturi 23 and the third venturi 25 and then is ejected to the outside of the thrust enhancing device 20. In the meantime, the surrounding air is sucked into the thrust enhancing device 20 through the inlet portions 21a, 23a, and 25a of the first, second, and third venturis 21, 23, and 25 and merged into a main flow (the flow of the fluid discharged from the outlet port 46e).

Figure 25A:
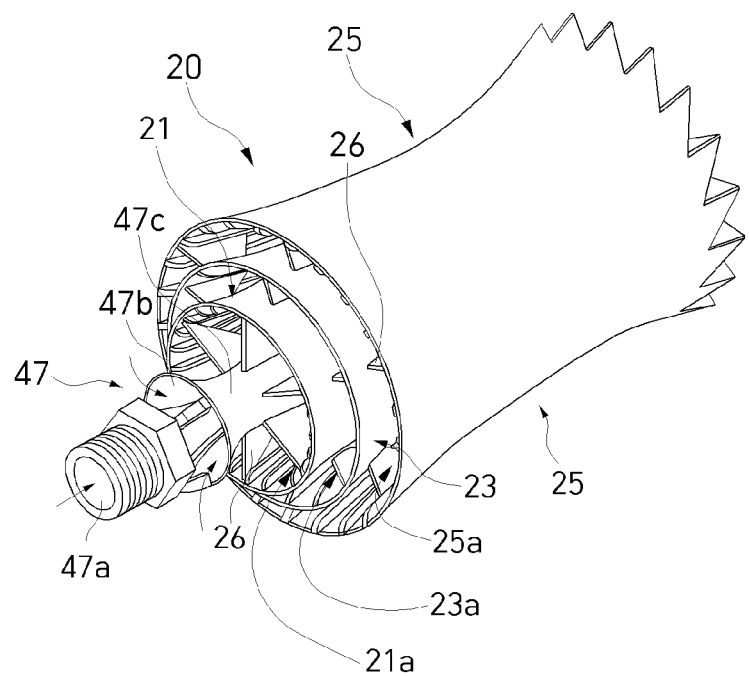
FIGS. 25A and 25B are perspective views of a mixing eductor using the thrust enhancing device according to the embodiment of the present invention.
Figure 25B:
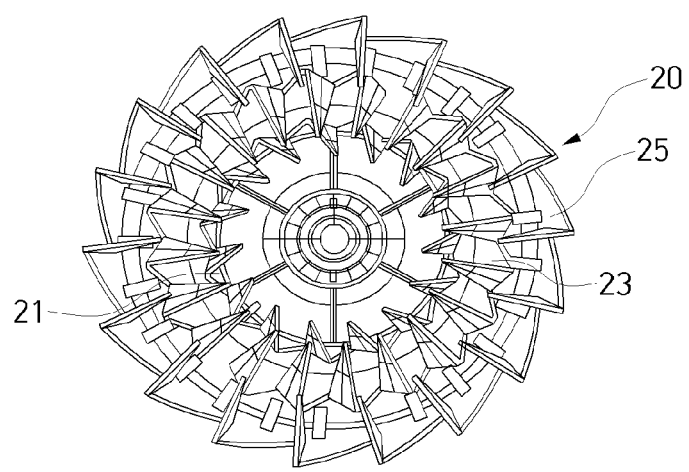

FIG. 25 is a perspective view of a mixing eductor 47 using the thrust enhancing device 20 according to the embodiment of the present invention.

The mixing eductor 47 has a fluid supply port 47a and an extension tube 47c. The fluid supply port 47a and the extension tube 47c are spaced apart from each other and provide an inflow passageway 47b therebetween. The extension tube 47c is a venturi-type tube.

Therefore, when a fluid is supplied into the fluid supply port 47a, the fluid passes through the extension tube 47c and is ejected to the outside. In this case, low pressure is formed in the extension tube 47c, and an outside fluid is sucked into the extension tube 47c through the inflow passageway 47b.

The fluid having passed through the extension tube 47c sequentially passes through the first venturi 21, the second venturi 23, and the third venturi 25, the fluid and the surrounding fluid introduced through the inlet portions 21a, 23a, and 25a are mixed and then ejected. Of course, compared to a flow rate of the fluid introduced through the fluid supply port 47a, a flow rate of the fluid ejected through the outlet portion of the third venturi 25 increases.

Figure 26A:
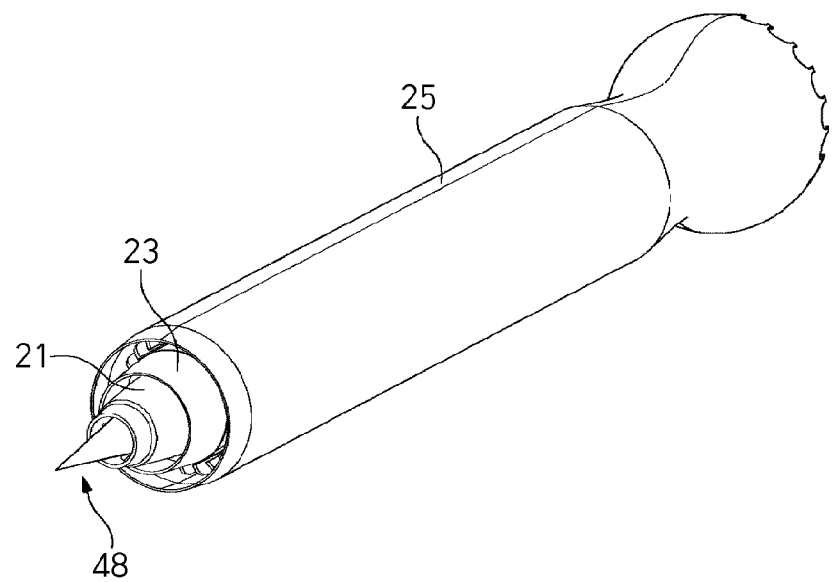
FIGS. 26A and 26B are views illustrating states in which the thrust enhancing device according to the embodiment of the present invention is applied to a missile, a rocket engine, and a jet engine.
Figure 26B:
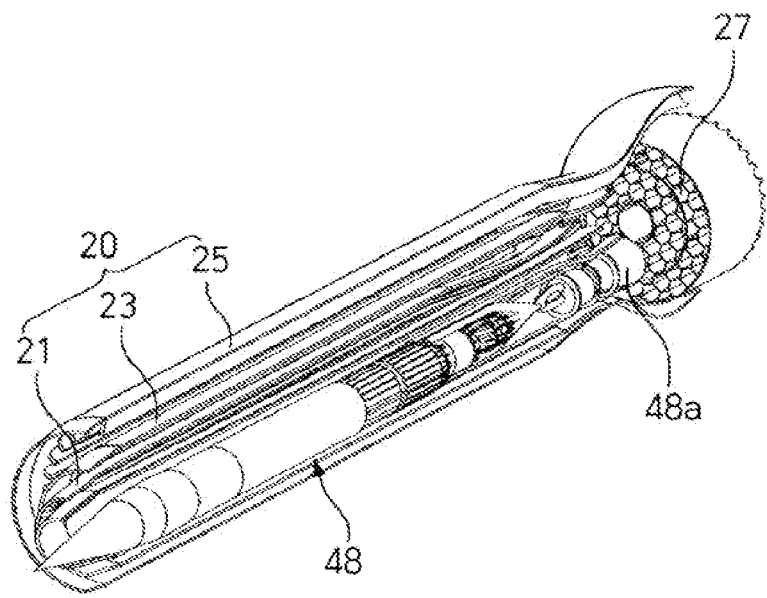

FIGS. 26A and 26B are views illustrating states in which the thrust enhancing device according to the embodiment of the present invention is applied to a synergetic air breathing rocket engine (SABRE) 48.

The thrust enhancing device 20 according to the present embodiment may also be applied to the synergetic air breathing rocket engine 48. The thrust may be enhanced as the thrust enhancing device 20 is applied to the synergetic air breathing rocket engine 48, such that a velocity may be increased, and a range of a synergetic air breathing rocket may be extended, for example. In other words, the synergetic air breathing rocket engine 48 may move farther by a smaller amount of fuel.

As illustrated, the thrust enhancing device 20 of the present embodiment surrounds the synergetic air breathing rocket engine 48. That is, the first venturi 21 surrounds the synergetic air breathing rocket engine 48, the second venturi 23 surrounds the first venturi 21, and the third venturi 25 surrounds the second venturi 23.

In addition, the direct-ejection inducer 27 is fixed to a rear side of an ejection nozzle 48a positioned at a rear end of the synergetic air breathing rocket engine 48. The direct-ejection inducer 27 is fixed to the inside of the outlet portion of the third venturi 25 and guides a stream line of an ejection flow. A high-temperature fluid ejected from the ejection nozzle 48a sequentially passes through the neck portions 21b, 23b, and 25b of the first, second, and third venturis, passes through the direct-ejection inducer 27, and then is ejected to the outside. In this case, of course, outside air is introduced through the inlet portions 21a, 23a, and 25a of the first, second, and third venturis 21, 23, and 25, and the outside air and gas ejected from the ejection nozzle are mixed and then ejected.

Figure 27A:
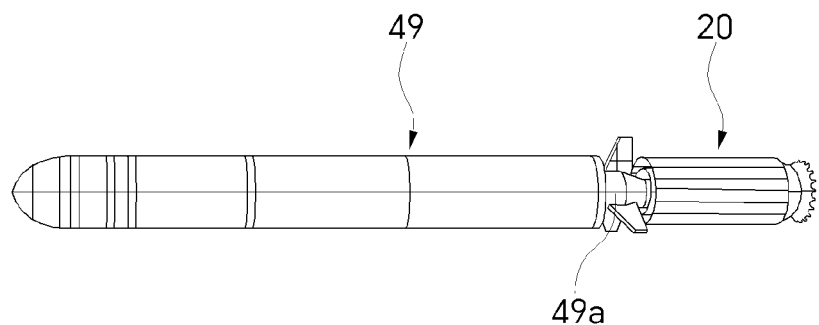
Figure 27B:
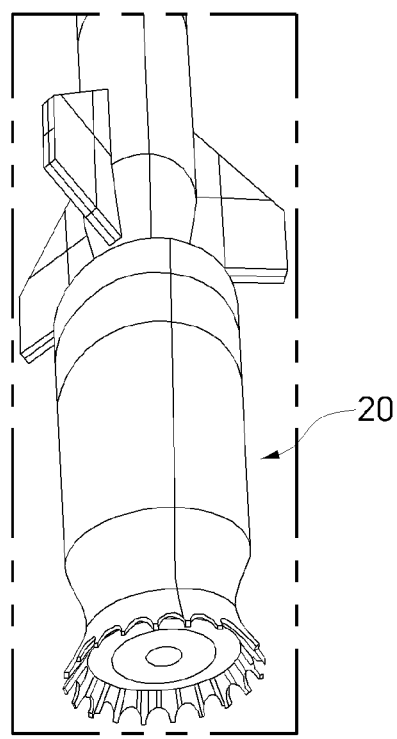

FIGS. 27A and 27B are views illustrating a missile and a rocket engine to which the thrust enhancing device according to the embodiment of the present invention is applied.

With reference to the drawings, it can be seen that the thrust enhancing device 20 is mounted at a rear side of an ejection nozzle 49a of a missile and rocket engine 49. The thrust enhancing device 20 ejects rearward a mixture of high-temperature gas ejected from the ejection nozzle 49a and the additional fluid introduced into the first, second, and third venturis 21, 23, and 25 from the surrounding region. It is possible to enhance thrust of the missile and rocket engine 49 by applying the thrust enhancing device 20.

Figure 28A:
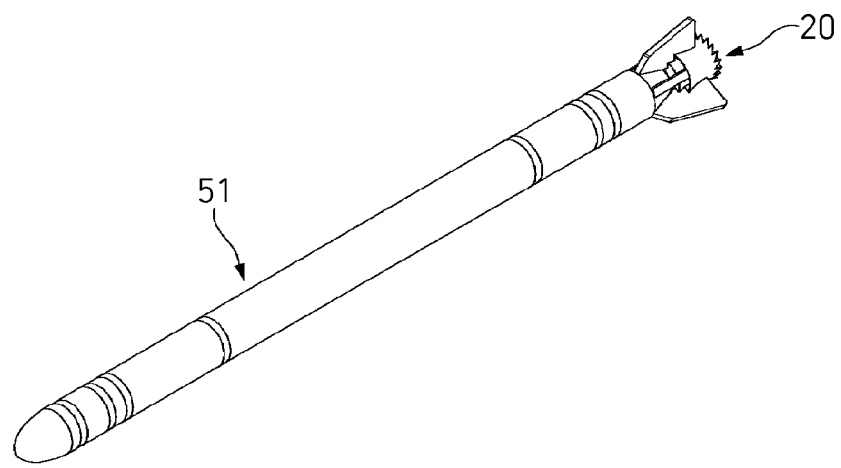
FIGS. 28A and 28B are perspective views of a torpedo to which the thrust enhancing device according to the embodiment of the present invention is applied.
Figure 28B:
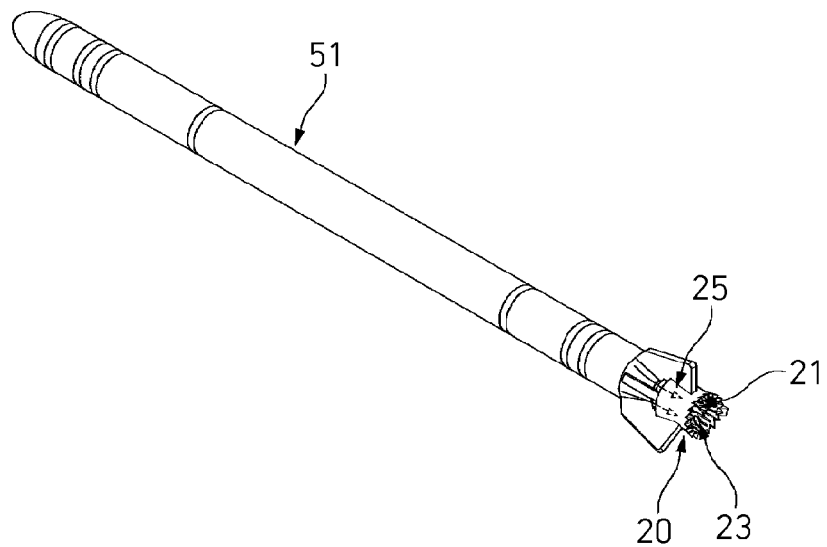

FIGS. 28A and 28B are perspective views of a torpedo to which the thrust enhancing device according to the embodiment of the present invention is applied.

As illustrated, the thrust enhancing device 20 is installed at a rear end of a torpedo 51. Of course, a propulsion engine (not illustrated) of the torpedo is positioned forward of the thrust enhancing device 20. The propulsion engine of the torpedo is a propeller propulsion system.

The first, second, and third venturis 21, 23, and 25 of the thrust enhancing device 20 allow a basic fluid, i.e., water ejected from the propulsion engine to pass therethrough and eject the water rearward. The surrounding water is introduced through the inlet portions 21a, 23a, and 25a while the ejected fluid passes through the first, second, and third venturis, and the surrounding water and the basic fluid are mixed and then ejected. As described above, because the mixture of the basic fluid and the additional fluid is ejected, the thrust increases.

Figure 29A:
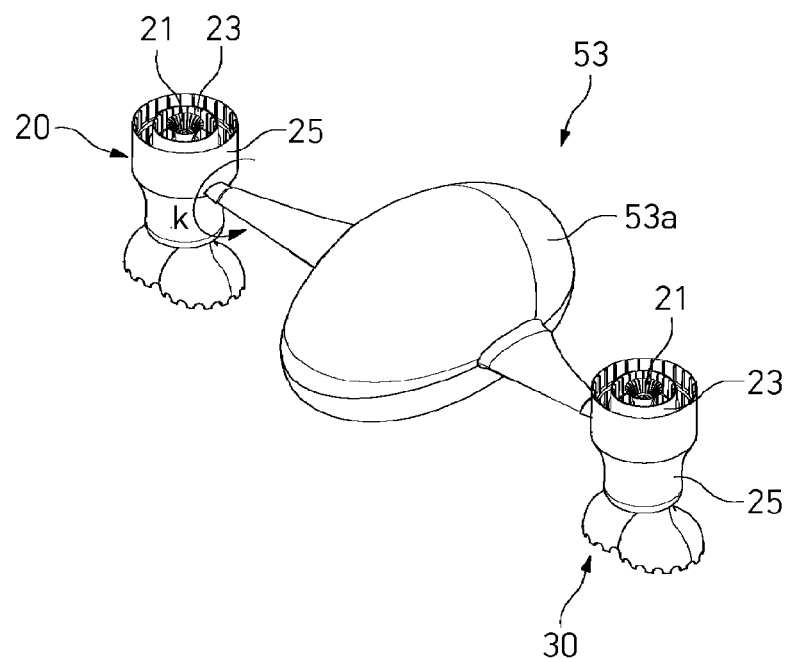
FIGS. 29A and 29B are perspective views of an air taxi to which the thrust enhancing device according to the embodiment of the present invention is applied.
Figure 29B:
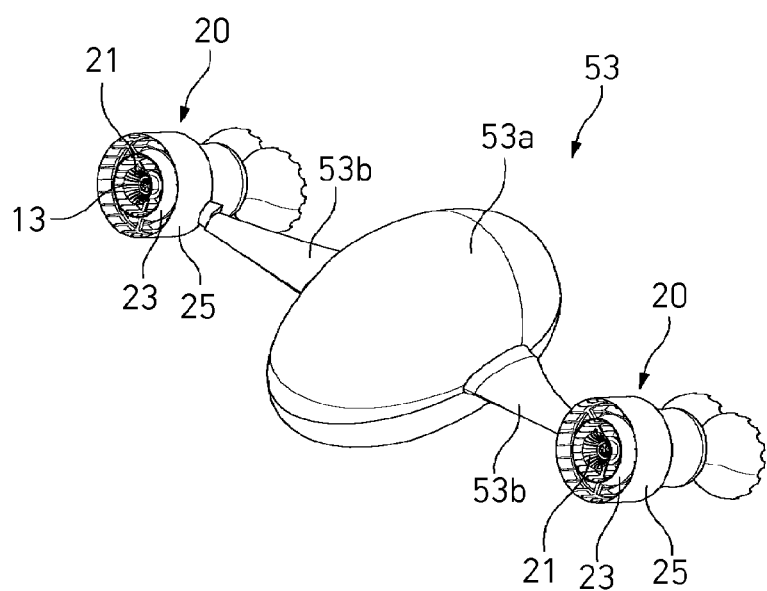

FIGS. 29A and 29B are perspective views of an air taxi 53 to which the thrust enhancing device according to the embodiment of the present invention is applied.

With reference to the drawings, four thrust enhancing devices 20 are disposed around a compartment 53a in which a user is seated. The propeller propulsion system 13 is installed in each of the thrust enhancing devices 20. The compartment 53a and the thrust enhancing devices 20 are connected by connection arms 53b. The propeller propulsion system 13 is directed vertical upward and moves the air taxi 53 upward, downward, forward, or rearward on the principle of a drone.

The thrust enhancing device 20 receives a downward flow, which is generated when the propeller propulsion system 13 operates, and guides the downward flow downward. A fluid, which is ejected downward by the propeller propulsion system 13, sequentially passes through the first, second, and third venturis 21, 23, and 25. In this case, outside air is introduced into the thrust enhancing device 20 through the inlet portions 21a, 23a, and 25a, and then the outside air and the basic fluid ejected from the propeller propulsion system are mixed and then discharged.

Figure 30:
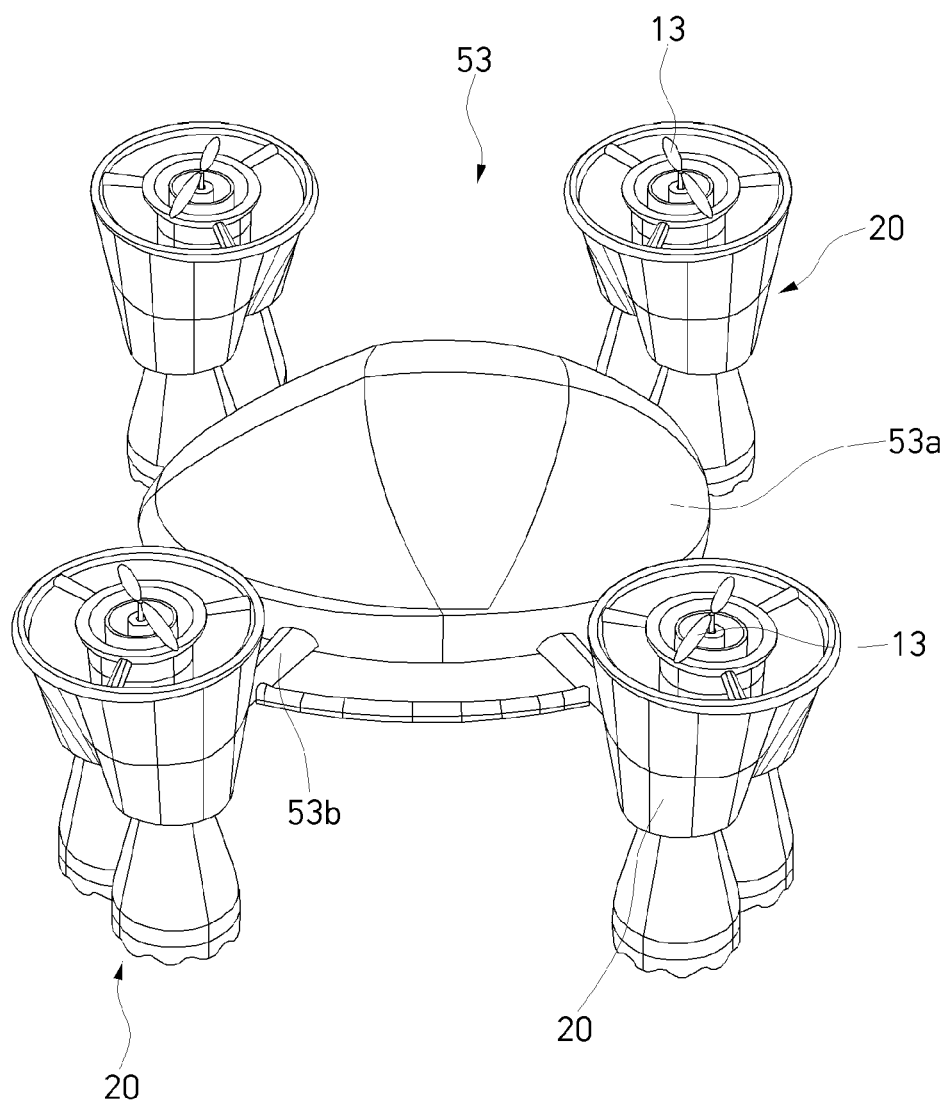
FIG. 30 is a view illustrating another embodiment of the air taxi to which the thrust enhancing device according to the embodiment of the present invention is applied.

FIG. 30 is a view illustrating another embodiment of the air taxi 53 to which the thrust enhancing device according to the embodiment of the present invention is applied.

The air taxi 53 illustrated in FIG. 30 includes the compartment 53a in which a user is seated, the thrust enhancing devices 20 provided at two opposite sides of the compartment 53a, and the propeller propulsion systems 13 installed inside the thrust enhancing devices 20.

The connection arms 53b are provided at two opposite sides of the compartment 53a. The connection arms 53b extend horizontally in opposite directions from the compartment 53a. An extension end of the connection arm is coupled to the thrust enhancing device 20. The thrust enhancing device 20 may rotate in a direction of arrow k or a direction opposite to the direction of arrow k in a state in which the thrust enhancing device 20 is supported on the connection arm 53b.

When the propeller propulsion system 13 accommodated in the thrust enhancing device 20 operates, the air, which is ejected downward by the propeller propulsion system 13, sequentially passes through the first venturi 21, the second venturi 23, and the third venturi 25 and is ejected downward. In this case, the surrounding air is sucked into the thrust enhancing device 20 through the inlet portions 21a, 23a, and 25a, and the surrounding air and the basic fluid ejected from the propeller propulsion system 13 are mixed and then ejected.

Figure 31A:
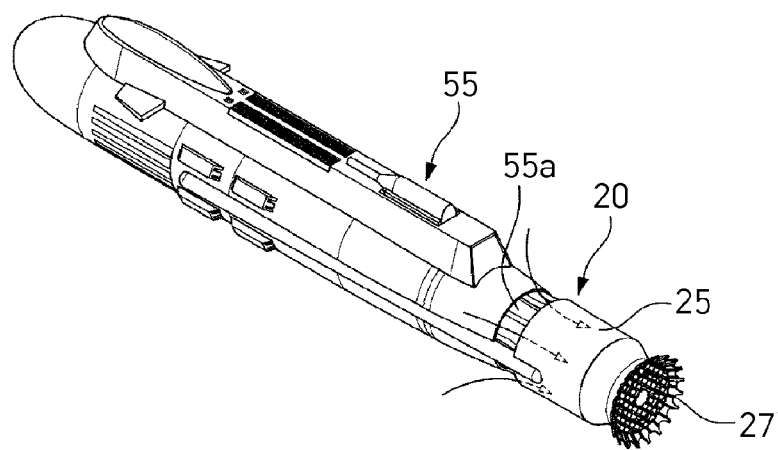
FIGS. 31A to 31C are perspective views of a submarine to which the thrust enhancing device according to the embodiment of the present invention is applied.
Figure 31B:
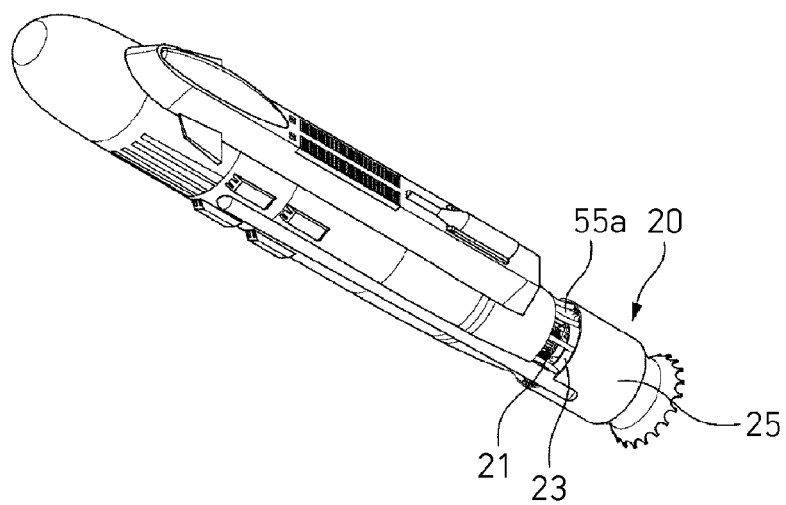
Figure 31C:
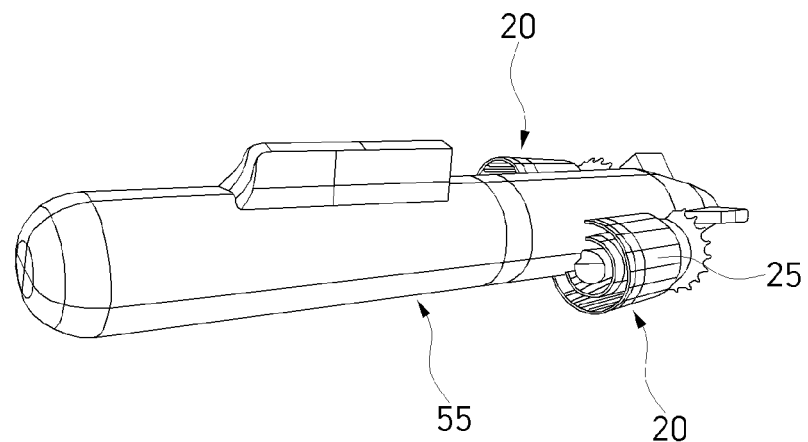

FIGS. 31A to 31C are perspective views of a submarine 55 to which the thrust enhancing device according to the embodiment of the present invention is applied.

As illustrated, the thrust enhancing device 20 is installed at a rear end of the submarine 55. The thrust enhancing device 20 additionally generates a reaction force while allowing water, which is ejected from a propeller structure installed in the submarine, to pass therethrough, thereby enhancing a propulsive force of the submarine 55.

Reference numeral 55a indicates an inflow passageway. An inflow passageway 55a is a passageway through which water around the submarine is introduced into the inlet portions 21a, 23a, and 25a of the first, second, and third venturis 21, 23, and 25.

Figure 32A:
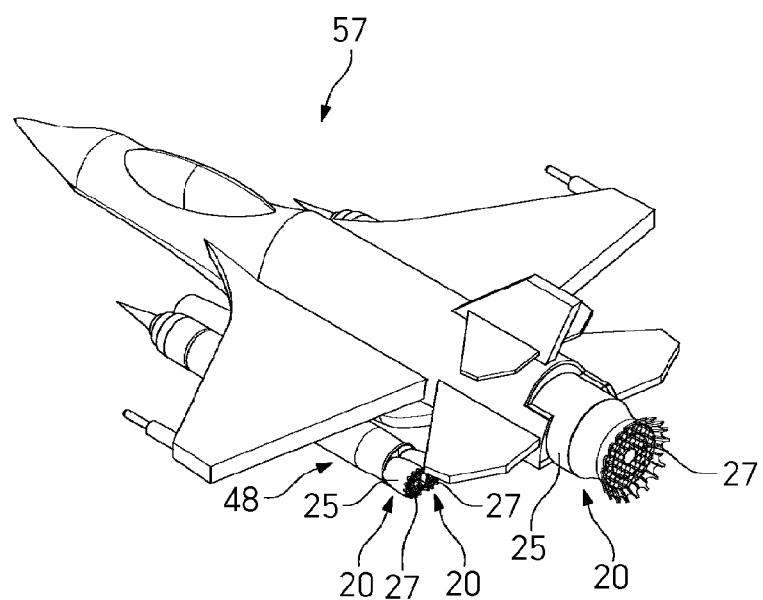
FIGS. 32A and 32B are views of a fighter aircraft to which the thrust enhancing device according to the embodiment of the present invention is applied.
Figure 32B:
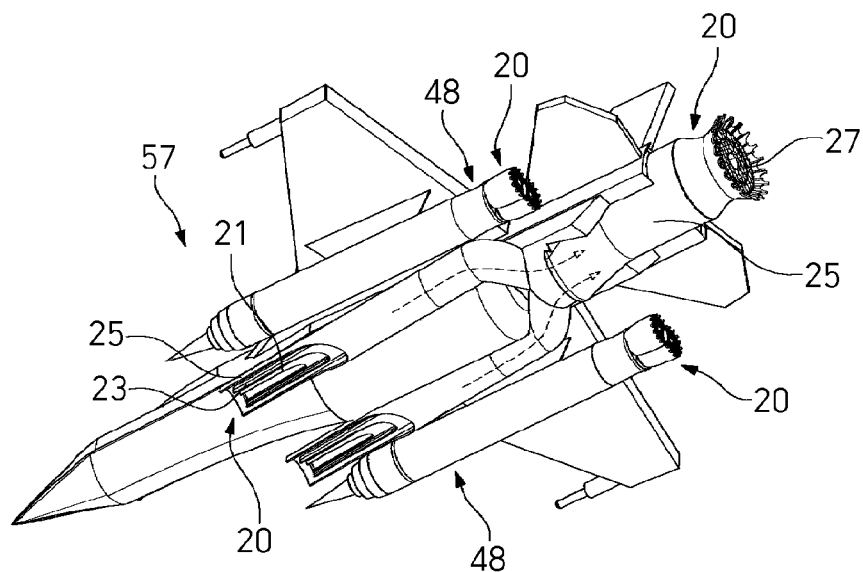

FIGS. 32A and 32B are views illustrating a fighter aircraft 57 to which the thrust enhancing device 20 according to the embodiment of the present invention is applied.

As illustrated, the thrust enhancing device 20 may be applied to a rear side of a jet engine of the fighter aircraft 57. The thrust enhancing device 20 increases a highest velocity and a propulsive force of the fighter aircraft by enhancing thrust of the jet engine of the fighter aircraft.

In addition, as illustrated in FIG. 32B, the first venturi 21, the second venturi 23, and the third venturi 25 are also applied to a part that guides outside air to an engine, such that the air is supplied to the engine at a higher flow rate.

Figure 33A:
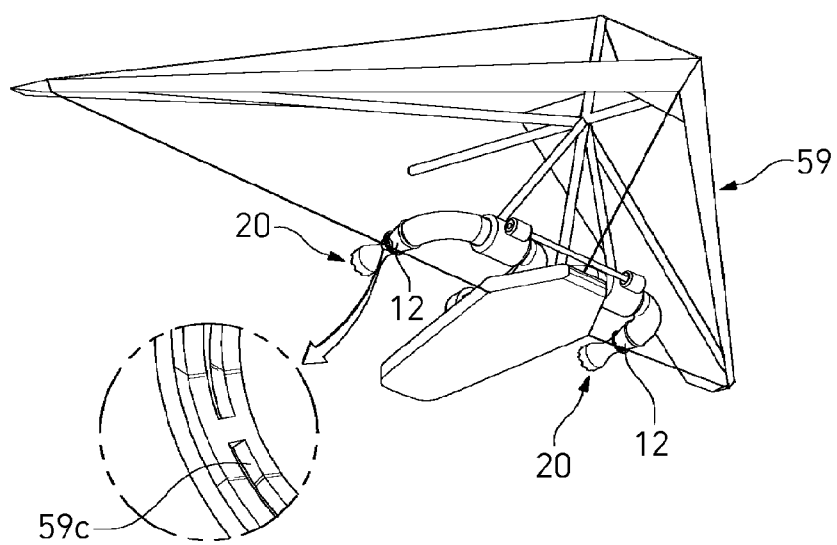
FIGS. 33A and 33B are perspective views illustrating states in which a jetpack and a hang glider to which the thrust enhancing device according to the embodiment of the present invention is applied are coupled.
Figure 33B:
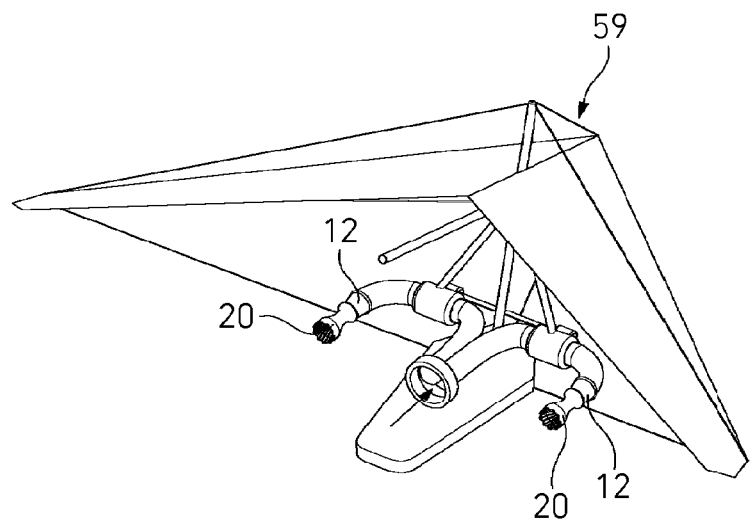

FIGS. 33A and 33B is a perspective view illustrating a state in which a hang glider 59 and the jetpack (43 in FIG. 22) to which the thrust enhancing device according to the embodiment of the present invention is applied are coupled.

With reference to the drawings, it can be seen that the thrust enhancing device 20 is mounted in the ejection nozzle 12 of the jetpack 43 that provides a propulsive force to the hang glider 59.

The ejection nozzle 12 is a nozzle that ejects water supplied from the outside through a hose. Two ejection nozzles are symmetrically disposed.

The thrust enhancing device 20 mounted in the ejection nozzle 12 has the same structure as the thrust enhancing device 20 installed in the jetpack 43 described with reference to FIG. 22 and enhances a propulsive force on the basis of the same principle. Reference numeral 59c indicates a passageway through which outside air is introduced into the thrust enhancing device 20.

While the present invention has been described above in detail with reference to the specific embodiments, the present invention is not limited to the embodiments but may be variously modified by those skilled in the art without departing from the technical spirit of the present invention.

The invention claimed is:

1. A thrust enhancing device, which enhances thrust of a thrust generation part in a state of being coupled to the thrust generation part configured to obtain a propulsive force by using a reaction force of a fluid, the thrust enhancing device comprising:

a venturi part configured to receive a basic fluid allowed to flow by the thrust generation part and allow the basic fluid to pass through the inside thereof, the venturi part being configured to induce a pressure drop in the inside thereof while the basic fluid passes therethrough, suck a surrounding fluid around the thrust generation part into the inside thereof, and then eject the surrounding fluid together with the basic fluid to increase a total ejection flow rate; and an ejection induction part disposed in an inner flow field of the venturi part and configured to linearize a flow of a combined fluid of the basic fluid and the surrounding fluid to be ejected to the outside of the venturi part, wherein the ejection induction part comprises a direct-ejection inducer fixed in an outlet portion of the venturi part, the direct-ejection inducer comprising a ring-shaped grid plate casing, and a grid plate member provided in a form of a honeycomb and fixed into the ring-shaped grid plate casing, and wherein the grid plate member provides straight ejection passageways through which the combined fluid passes in a form of a straight streamline while colliding with the grid plate member.

2. The thrust enhancing device of claim 1, wherein the venturi part comprises:
a first venturi coupled to the thrust generation part and comprising an inlet portion, an outlet portion, and a streamlined neck portion positioned between the inlet portion and the outlet portion and having a smaller inner diameter than the inlet and outlet portions; and
a second venturi comprising an inlet portion, an outlet portion, and a streamlined neck portion positioned between the inlet portion and the outlet portion and having a smaller inner diameter than the inlet and outlet portions, the second venturi being configured to accommodate the first venturi so that the outlet portion of the first venturi is positioned in the neck portion of the second venturi.

3. The thrust enhancing device of claim 2, wherein the venturi part further comprises a third venturi comprising an inlet portion, an outlet portion, and a streamlined neck portion formed between the inlet portion and the outlet portion and having a smaller inner diameter than the inlet and outlet portions, the third venturi being configured to accommodate the second venturi so that the outlet portion of the second venturi is positioned in the neck portion of the third venturi.

4. The thrust enhancing device of claim 3, wherein stream guiders are provided on inner wall surfaces of the first, second, and third venturis and guide the flow of the combined fluid.

5. The thrust enhancing device of claim 3, wherein the direct-ejection inducer is fixed in the outlet portion of the third venturi.

6. The thrust enhancing device of claim 3, wherein the ejection induction part comprises a plurality of bent blades made by cutting ends of the first, second, and third venturis at sides of the outlet portions at predetermined intervals in a circumferential direction and then bending the ends of the first, second, and third venturis toward an inside of a flow field.

7. The thrust enhancing device of claim 1, wherein two or more outlet portions of the third venturi are formed in parallel, and direct-ejection inducers are respectively mounted in the outlet portions.

8. The thrust enhancing device of claim 1, wherein the thrust generation part comprises a water jet nozzle, a jet engine, a rocket engine, or a propeller propulsion system that allows water supplied from the outside to pass therethrough and ejects the water.

9. The thrust enhancing device of claim 1, wherein the thrust generation part is a turbo-fan jet engine, and wherein a water injector nozzle is further installed in the venturi part and ejects water to be vaporized and expanded by heat generated in the turbo-fan jet engine.

10. A thrust enhancing device, which has a combination of a plurality of venturis having different sizes and an identical central axis, the thrust enhancing device comprising:
a venturi part configured to induce a pressure drop in the inside thereof while allowing a basic fluid to pass therethrough through a central axis portion, suck a surrounding fluid into the inside thereof, and then eject a combined fluid of the surrounding fluid and the basic fluid to increase a total ejection flow rate; and
a direct-ejection inducer fixed in an outlet portion of the venturi part, the direct-ejection inducer comprising a ring-shaped grid plate casing, and a grid plate member provided in a form of a honeycomb and fixed into the ring-shaped grid plate casing, and
wherein the grid plate member provides straight ejection passageways through which the combined fluid passes in a form of a straight streamline while colliding with the grid plate member.

11. A thrust enhancing device, which enhances thrust of a thrust generation part in a state of being coupled to the thrust generation part configured to obtain a propulsive force by using a reaction force of a fluid, the thrust enhancing device comprising:
a venturi part configured to receive a basic fluid allowed to flow by the thrust generation part and allow the basic fluid to pass through the inside thereof, the venturi part being configured to induce a pressure drop in the inside thereof while the basic fluid passes therethrough, suck a surrounding fluid around the thrust generation part into the inside thereof, and then eject the surrounding fluid together with the basic fluid to increase a total ejection flow rate; and
an ejection induction part disposed in an inner flow field of the venturi part and configured to linearize a flow of a combined fluid of the basic fluid and the surrounding fluid to be ejected to the outside of the venturi part,
wherein the ejection induction part comprises a direct-ejection inducer fixed in an outlet portion of the venturi part, the direct-ejection inducer comprising a ring-shaped grid plate casing, and a grid plate member fixed into the ring-shaped grid plate casing,
wherein one surface of the ring-shaped grid plate casing includes portions obtained by cutting an end part of the ring-shaped grid plate casing at predetermined intervals in a circumferential direction, and
wherein the grid plate member comprises a plurality of grid plate members, each having a shape of extending radially from a central portion of the direct-ejection inducer and providing straight ejection passageways through which the combined fluid passes in a form of a straight streamline while colliding with the plurality of grid plate members.

* * * * *